(12) United States Patent
Ganesan et al.

(10) Patent No.: US 10,452,876 B2
(45) Date of Patent: Oct. 22, 2019

(54) SYSTEMS AND METHODS FOR ASYMMETRIC BACKSCATTER COMMUNICATIONS

(71) Applicant: University of Massachusetts, Boston, MA (US)

(72) Inventors: Deepak Ganesan, Amherst, MA (US); Pan Hu, Palo Alto, CA (US); Pengyu Zhang, Palo Alto, CA (US)

(73) Assignee: University of Massachusetts, Boston, MA (US)

( * ) Notice: Subject to any disclaimer, the term of this patent is extended or adjusted under 35 U.S.C. 154(b) by 0 days.

(21) Appl. No.: 15/664,832

(22) Filed: Jul. 31, 2017

(65) Prior Publication Data

US 2018/0032768 A1 Feb. 1, 2018

Related U.S. Application Data

(60) Provisional application No. 62/368,586, filed on Jul. 29, 2016.

(51) Int. Cl.
*G06K 7/10* (2006.01)
*G06K 19/07* (2006.01)

(52) U.S. Cl.
CPC ..... *G06K 7/10297* (2013.01); *G06K 7/10069* (2013.01); *G06K 7/10158* (2013.01); *G06K 19/0709* (2013.01); *G06K 19/0723* (2013.01)

(58) Field of Classification Search
CPC ........... G06K 7/10297; G06K 7/10069; G06K 7/10158; G06K 7/0008; G06K 7/10019;
(Continued)

(56) References Cited

U.S. PATENT DOCUMENTS

| 5,218,343 A * | 6/1993 | Stobbe | G06K 7/0008 340/10.51 |
| 2005/0225447 A1* | 10/2005 | Diorio | G06K 7/0008 340/572.4 |

(Continued)

FOREIGN PATENT DOCUMENTS

WO 2018/005855 A1 1/2018

OTHER PUBLICATIONS

[NoAuthorListed] Laird Technologies, Cushcraft S9028PCRW RFID antenna. Publication Date Unknown. 2 Pages.
(Continued)

*Primary Examiner* — Edwin C Holloway, III
(74) *Attorney, Agent, or Firm* — Thomas Horstemeyer, LLP

(57) ABSTRACT

Systems and methods for backscatter communications are provided that employ a backscatter reader to transmit a carrier signal to multiple backscatter tags having heterogeneous hardware and specifications. In response to receiving the carrier, the tags encode data into the received signal and, concurrently, transmit their respective backscattered signal to the reader. The concurrent signals are received by the reader as a combined signal. The reader detects edges in the received signal, based on the corresponding in-phase (I) and quadrature (Q) signals. The edges are then assigned to streams based on the offset or transmission rate of the tags. In some cases, the reader can detect edge collisions. These collisions can be resolved by causing the colliding signals to be retransmitted or by separating the colliding signals. The individual streams corresponding to each of the tags can then be decoded to identify the originally transmitted data from each tag.

29 Claims, 20 Drawing Sheets

(58) Field of Classification Search
CPC .......... G06K 7/10059; G06K 19/0723; H04W 74/08; H04W 74/0833; H04W 74/0841
USPC ...................................................... 340/10.2
See application file for complete search history.

(56) References Cited

U.S. PATENT DOCUMENTS

| | | | | |
|---|---|---|---|---|
| 2007/0069864 | A1* | 3/2007 | Bae | H04B 5/0062 340/10.2 |
| 2008/0231450 | A1* | 9/2008 | Posemantier | G06K 7/10356 340/572.1 |
| 2010/0039233 | A1* | 2/2010 | Niedzwiecki | H04Q 9/00 340/10.1 |
| 2010/0109844 | A1* | 5/2010 | Carrick | G01S 5/14 340/10.1 |
| 2011/0133831 | A1* | 6/2011 | Kim | H03D 7/165 329/347 |
| 2012/0139711 | A1* | 6/2012 | Nikitin | G06K 7/10039 340/10.4 |
| 2013/0271266 | A1* | 10/2013 | Powell | G06K 7/10029 340/10.1 |
| 2016/0092706 | A1* | 3/2016 | Deyle | H04B 5/0031 340/10.1 |
| 2017/0373892 | A1 | 12/2017 | Ganesan et al. | |

OTHER PUBLICATIONS

[NoAuthorListed] MSP430 Mixed Signal Microcontroller, www.ti.com (Texas Instruments); SLAS541K—Jun. 2007—Revised Nov. 2012, 104 pages.

[NoAuthorListed] NX3225GD 8 MHz crystal clock, <www.ndk.com/images/products/catalog/c_NX3225GD-STD-CRA-3_e.pdf.> Copyright © 1997-2018 Nihon Dempa Kogyo Co., Ltd.

[NoAuthorListed] PCF8523 Real-time clock (RTC) and calendar <https://www.nxp.com/docs/en/data-sheet/PCF8523.pdf>, © NXP Semiconductors N.V. Apr. 28, 2015 78 pages.

[NoAuthorListed] Radio-Frequency Identity Protocols Class-1 Generation-2, http://www.autoid.org/2005docs/SG3_200501_435_UHFGen2_v1.0.8.pdf; accessed via Wayback Machine © 2004 <https://web.archive.org/web/20061003021112/www.autoid.org/2005docs/SG3_200501_435_UHFGen2_v1.0.8.pdf>.

Angerer, C. et al., "RFID reader receivers for physical layer collision recovery," IEEE Transactions on Communications, 58(12):3526-3537, 2010.

Buettner, M. et al, "A software radio-based UHF RFID reader for PHY/MAC experimentation," 2011 IEEE International Conference on RFID, RFID 2011; pp. 134-141.

Buettner, M., et al., "Dewdrop: An energy-aware runtime for computational RFID," NSDI 2011, pp. 197-210.

Finkenzeller, K. RFID Handbook; 3rd Ed. John Wiley and Sons, 2010.

Gollakota, S., et al., "Zigzag decoding: combating hidden terminals in wireless networks," SIGCOMM'08, Aug. 17-22, 2008, Seattle, Washington, USA. Copyright 2008 ACM 978-1-60558-175-0/08/08; pp. 159-170.

Gummeson, J., et al., "Flit: a bulk transmission protocol for rfid-scale sensors." In Proceedings of the 10th international conference on Mobile systems, applications, and services, pp. 71-84. ACM, 2012.

Halperin, D., et al., "Taking the sting out of carrier sense: interference cancellation for wireless lans." In Proceedings of the 14th ACM international conference on Mobile computing and networking, pp. 339-350. ACM, 2008.

Hu, P. et al., "Laissez-faire: Fully Asymmetric Backscatter Communication," Proc ACM SIGCOMM Conf. Aug. 15-21, 2015, 2015: 255-267.

Kang, L. et al., "DDC: A Novel Scheme to Directly Decode the Collisions in UHF RFID Systems," IEEE Transactions on Parallel and Distributed Systems, 2012, v. 23 (2):263-270.

Kellogg, B., et al, "Wi-fi backscatter: internet connectivity for rf-powered devices," SIGCOMM '14, Proceedings of the 2014 ACM conference on SIGCOMM, pp. 607-618. ACM, Aug. 17-22, 2014.

Kellogg, B. et al., "Bringing gesture recognition to all devices," 11th USENIX Symposium on Networked Systems Design and Implementation, NSDI 14, 2014, pp. 303-316.

Liu, V., et al., "Ambient backscatter: wireless communication out of thin air." In ACM SIGCOMM Computer Communication Review, vol. 43, pp. 39-50. ACM, 2013.

Parks, A. N., et al., "Turbocharging ambient backscatter communication," Proceedings of the 2014 ACM conference on SIGCOMM, pp. 619-630. ACM, 2014.

Sample, A. P. et al., "Design of an RFID-based battery-free programmable sensing platform," IEEE Transactions on Instrumentation and Measurement, 57(11):2608-2615, Nov. 2008.

Sen, S. et al., "Successive Interference Cancellation: A Back-of-the-Envelope Perspective," Proc. 9th ACM SIGCOMM Workshop on Hot Topics in Networks, Hotnets '10, Oct. 20-21, 2010, Monterey, CA, USA. Copyright 2010 ACM, pp. 1-6.

Skolnik, M. I., Introduction to Radar, the Radar Handbook, 1962.

Thomas, S. J. et al., "A 96 Mbit/sec, 155 pJ/bit 16-QAM modulator for UHF backscatter communication," 2012 IEEE International Conference on RFID, (RFID) 2012, pp. 185-190.

Tse, D. and Viswanath, P., Fundamentals of Wireless Communication, Cambridge University Press, 2005, 587 Pages.

Wang, J., et al, "Efficient and reliable low-power backscatter networks." In Proceedings of the ACM SIGCOMM 2012 Conference on Applications, technologies, architectures, and protocols for computer communication, pp. 61-72. ACM, 2012.

Yeager, D., et al. "A 9 μa, addressable gent sensor tag for biosignal acquisition." IEEE Journal of Solid-State Circuits, 45(10):2198-2209, 2010.

Zhang, P., et al., Blink: A high throughput link layer for backscatter communication. In Proceedings of the 10th International conference on Mobile systems, applications, and services, pp. 99-112. ACM, 2012.

Zhang, R, et al., "EkhoNet: High Speed Ultra Low-power Backscatter for Next Generation Sensors," Proceedings of the 20th annual international conference on Mobile computing and net-working, pp. 1-12. ACM, 2014.

Zhang, R, et al., Enabling bit-by-bit backscatter communication in severe energy harvesting environments. NSDI, Berkeley, CA, 2014; pp. 345-357.

Zhang, H. et al., "Moo: A batteryless computational RFID and sensing platform," University of Massachusetts Computer Science Technical Report UM-CS-2011-020, Jun. 27, 2011.

Zheng, Y. et al., "Read bulk data from computational RFIDs," INFOCOM, 2014 Proceedings IEEE, 9 pages.

* cited by examiner

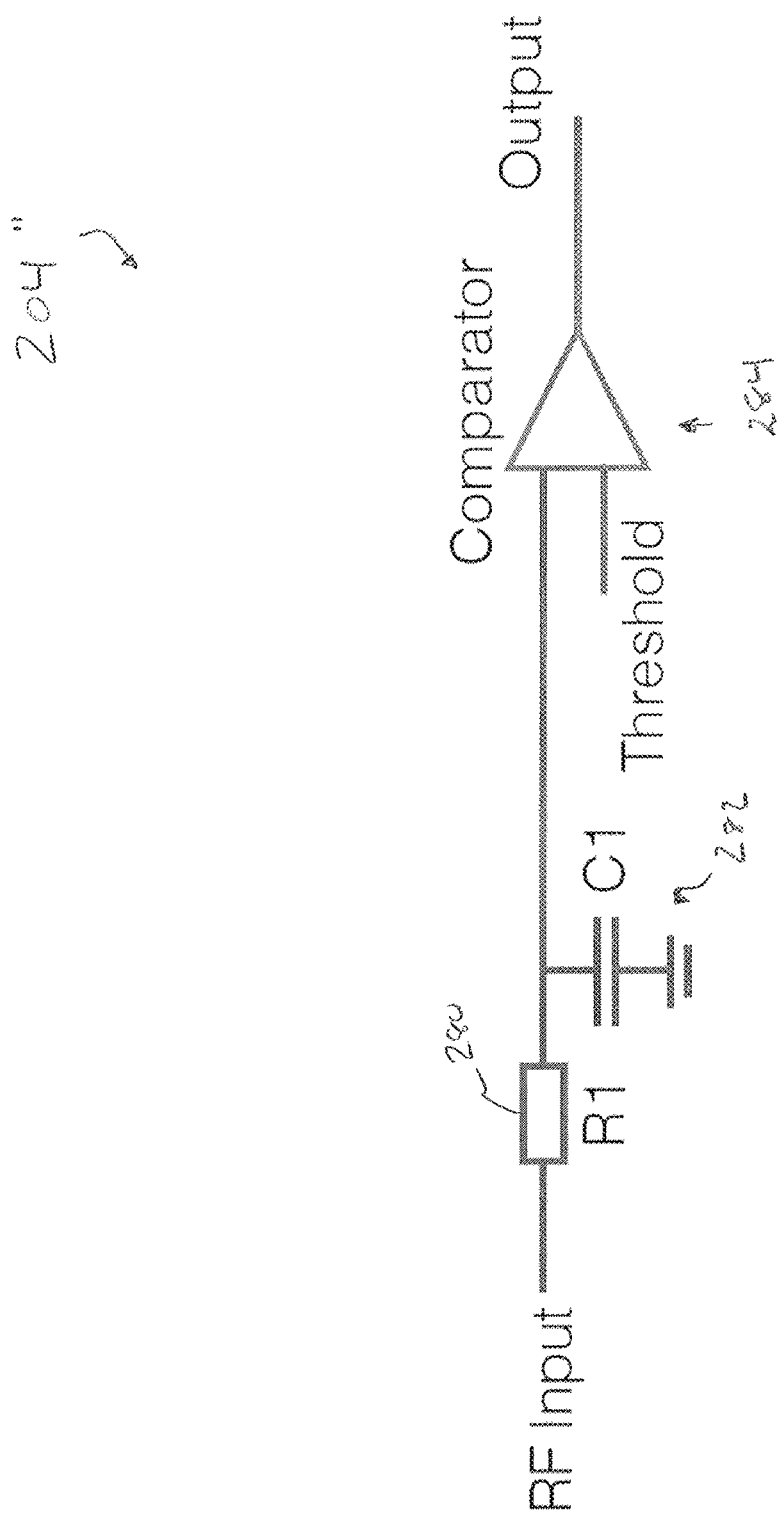

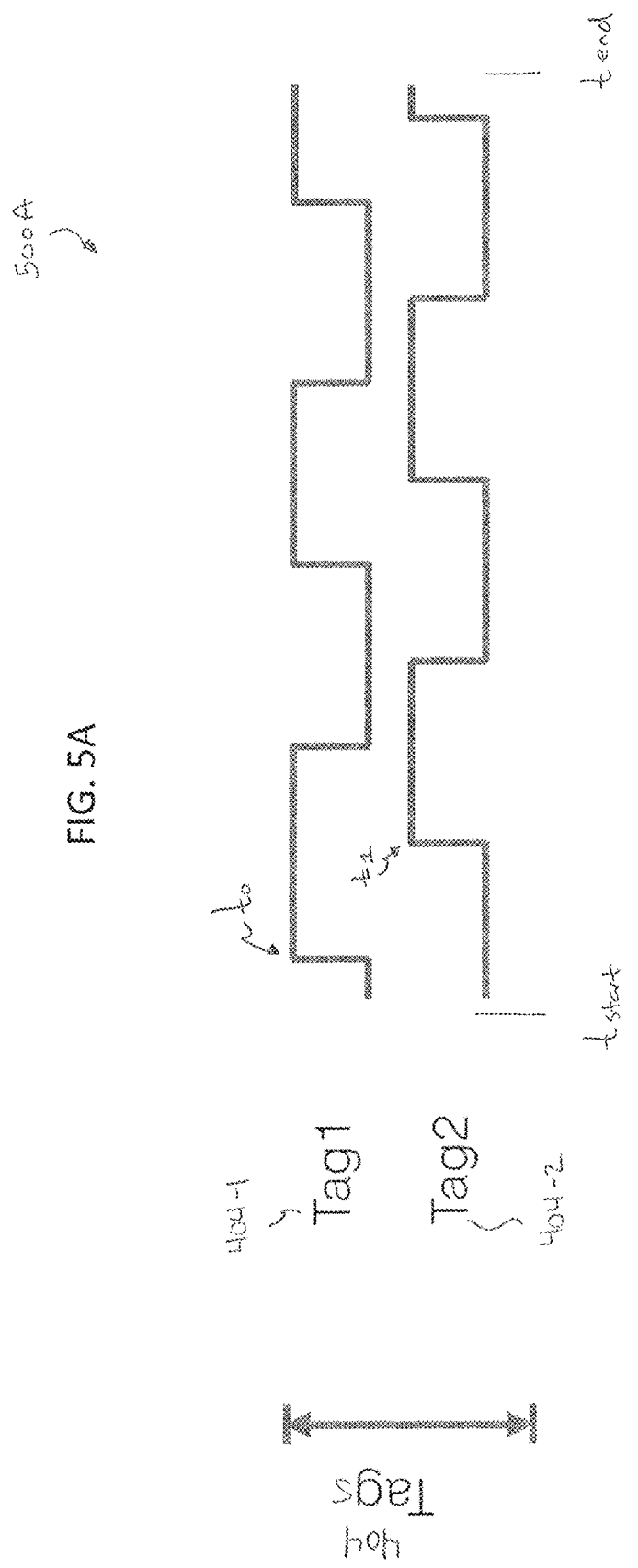

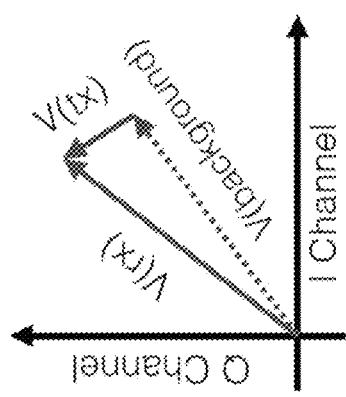
FIG. 6B(1)
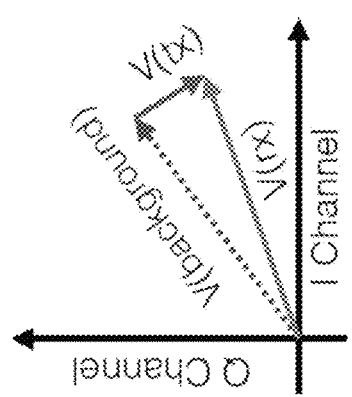
FIG. 6B(2)

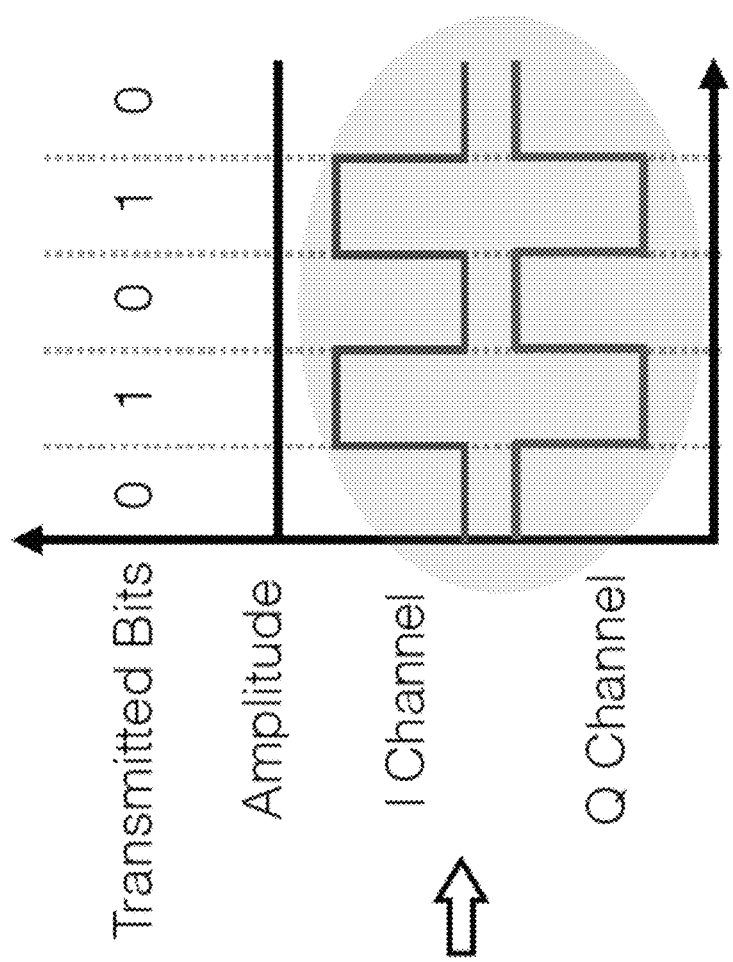
FIG. 6B(3)

SYSTEMS AND METHODS FOR ASYMMETRIC BACKSCATTER COMMUNICATIONS

CROSS REFERENCE TO RELATED APPLICATION

The present application claims priority to and the benefit of U.S. Provisional Application No. 62/368,586, filed on Jul. 29, 2016, and titled "Methods and Systems for Backscattering Communication Between a Reader and Backscatter Tags," the content of which is incorporated herein by reference in its entirety.

GOVERNMENT RIGHTS

This invention was made with Government support under Grant Nos. CNS-1218586, CNS-1217606, and CNS-1239341, each of which was awarded by the National Science Foundation, and Grant No. 1U54EB020404 awarded by the National Institute of Health. The Government has certain rights in the invention.

FIELD

The present application relates to systems and methods for providing wireless data communication, and more particularly relates to the use of fully asymmetric backscatter communication protocols to provide an ultra-low power way by which data can be wirelessly communicated.

BACKGROUND

With every passing day, the world becomes more digitally interconnected. The Internet of Things (IoT) continues to facilitate this interconnection of devices. In fact, estimates indicate that the number of connected devices is expected to grow to anywhere from 20 to 50 billion by the end of the decade. Connected devices can range from stand-alone, wireless sensors such as accelerometers, to wearable devices, vehicles, power plants, buildings, and more. Typically, interconnected devices are embedded with electronics and software, including connectivity means, in order to collect and/or exchange data with other devices.

Notably, wireless sensors are increasingly being embedded in just about any object or surface, in order to collect data and generate "smarter" people and things. For instance, sensors are often embedded in machines, walls, wearable devices, clothing, and even in and on people's bodies. These sensors are configured to sample data relating to their surroundings and/or the person or object on which they are provided. The sensors can then transmit the sampled data to other computing devices for further analysis and storage. Thus, in order to maximize the amount of data that can be gathered, sensors are optimized to be as power- and throughput-efficient as possible. To this end, low-power radios and technologies such as Bluetooth Low Energy (BLE), ZigBee, Z-Wave, and others have been developed to reduce the amount of power consumed by devices during the data exchange process. In addition, backscatter is a communications technique that shifts power burdens to the reader side as opposed to the tag (e.g., sensor) side. This is achieved, for example, by configuring the reader to generate a carrier signal that includes power to be delivered to the tag. As a result, the tag can benefit from less hardware complexity, enabling the creation of less expensive and smaller tags and sensors. This, in turn, allows more sensors to be deployed, and more data to be collected.

One drawback of existing backscattering techniques is that they are not designed to provide the same power-consumption benefits when dealing with concurrent transmission from heterogeneous sensors a variety of sensors having different sampling and transmission rates. For example, traditional backscattering techniques are optimized for specific hardware configurations. By requiring all nodes to transmit data at a particular rate, existing backscattering techniques either underutilize the transmission rates of more efficient tags or cause less efficient tags to employ other hardware and logic (e.g., clock, buffer) to transmit data at the selected rate.

Thus, there is a need for a backscatter protocol that enables a reader to decode transmitted asynchronous and concurrent signals from heterogeneous tags. There is also a need for tags to be able to transmit at their respectively optimal rates. There is further a need to minimize the hardware and logic at the tags, in order to reduce the power consumption and size of the tags.

SUMMARY

Systems and methods for asymmetric backscatter communications are provided for in the present disclosure. More particularly, a laissez faire (LF) backscatter protocol is described herein that enables multiple backscatter tags to concurrently communicate with a backscatter reader by shifting functionality to the backscatter reader, which has more computational power. Backscatter communications between the reader and the tags are asynchronous and asymmetric, meaning that the tags do not need to coordinate their transmissions with the reader and that each of the tags and the reader can transmit at their selected transmission rates. Rather than synchronizing communications, the reader transmits a carrier signal to the tags. In response, the tags encode data in a signal and backscatter that signal to the reader when each tag is ready, doing so at their selected transmission rates. That is, the tags do not have or apply any logic to determine when to begin their transmissions.

Because multiple tags can transmit signals concurrently, they are received by the reader as a combined or collided signal. The reader then handles the decoding of the combined signal to identify the data transmitted by each of the tags. To do so, the reader identifies edges in the combined signal. Edges in the signal indicate a transition of a tag from one state to another (e.g., high state to low state). In some embodiments, edges are identified using the I and Q channel signals corresponding to the combined signal. When the edges have been detected in the combined signal, they are then individually analyzed and assigned to streams corresponding to the backscatter tags. The reader is able to determine which tag generated each edge. Assigning edges to streams of the backscatter tags can be achieved using the offsets and transmission rates of the backscatter tags. In some embodiments, the reader can determine whether edges of two or more streams collided in the combined signal. Collisions can be detected in a number of manners, including based on the number of edge clusters on an IQ plot of the combined signal. If collisions are detected, the reader can either separate the collided edges or cause retransmission of the signals corresponding to the collided edges. The streams of edges are used to decode the signals corresponding to each of the tags and obtain the transmitted data.

In one exemplary embodiment of a method for decoding concurrent signals, a carrier signal is transmitted to a plurality of backscatter tags. A combined signal is received, comprising respective backscattered signals transmitted by the backscatter tags. The backscattered signals are transmitted at least partially concurrently by the backscatter tags, and the plurality of backscatter tags transmit the backscatter signals starting at respective offsets and transmission rates. Edges are detected in the received combined signal based on in-phase (I) and quadrature (Q) signals corresponding to the received combined signal. Each of the detected edges is assigned to streams corresponding to the plurality of backscatter tags, based on one or more of the offsets and transmission rates of the backscatter tags. And, the streams of detected edges are decoded by assigning one of a plurality of values to each of the detected edges of the streams corresponding to the plurality of backscatter tags, the plurality of values corresponding to the possible edge states of the detected edges.

In some embodiments, transmitting of the carrier signal (1) is initiated by re-starting a carrier wave generator, and causes the backscatter tags to start transmitting the backscattered signals. Moreover, in some embodiments, the backscattered signals are transmitted over a single frequency channel.

In some embodiments, the plurality of backscatter tags include backscatter tags having different sampling rates and transmission rates. Moreover, in some embodiments, the carrier signal includes power for powering the backscatter tags.

In some embodiments, data is encoded into the carrier signal by the backscatter tags to create the backscattered signals, by toggling the transistors of the backscatter tags. Toggling the transistors causes the edges to be created in the combined signal, the edges representing a transition from one edge state to another edge state.

In some embodiments, detecting the edges is performed as follows. A background signal is measured. The background signal indicates a frequency during a time when none of the plurality of backscatter tags are transmitting, Instances in the combined signal are identified in which a positive or negative change in frequency is larger than the frequency of the background signal and/or a predetermined threshold. Each of the identified instances represents an edge.

In some embodiments, assigning each of the detected edges to streams corresponding to the plurality of backscatter tags includes, for each of the detected edges: determining if an edge time at which the identified edge occurs is equal to the offset of any of the backscatter tags; and/or determining if the edge time at which the identified edge occurs overlaps with any anticipated state transition times of the backscatter tags, the anticipated state transition times being calculated based on the transmission rates and the offsets of the backscatter tags. For example, in some embodiments, one of the detected edges is assigned to one of the streams corresponding to one of the plurality of backscatter tags if the one of the detected edges occurs at an edge time that is equal to the offset of the one of the backscatter tags and/or if the one of the detected edges occurs at an edge time that overlaps with an anticipated state transition time of the one of the backscatter tags.

In some embodiments, the presence of colliding edges is detected among the detected edges. The colliding edges indicate that two or more of the streams have overlapping edges caused by the respective backscatter tags transitioning between edge states at a same time. The colliding edges are resolved by (1) causing the backscattered signals corresponding to the colliding edges to be retransmitted, or (2) separating the colliding edges. Detecting the presence of colliding edges includes: plotting the I and/or Q signals corresponding to the received combined signal on respective IQ plots; and identifying the number of clusters in each of the IQ plots. The colliding edges are deemed to be present among the detected edges if the number of identified clusters in any of the IQ plots exceeds the number of possible edge states. Each cluster in the IQ plots can represents a possible edge state. In some embodiments, when colliding edges are deemed to be present among the detected edges, the number of clusters in any of the IQ plots is equal to Nk, where N is equal to the number of tags colliding in the colliding edges, and k is equal to the number of possible edge states. The possible edge states can comprise, for example: (1) rising, (2) falling, and (3) constant.

In some embodiments, the colliding edges are separated by: identifying an origin cluster in the IQ plots, the origin cluster representing a constant edge state, and identifying midpoint clusters by: locating groups of the clusters that are co-linear; and locating the midpoint clusters among each of the groups of co-linear clusters. Edge differentials are identified based on the located midpoint clusters, the edge differentials indicating signal changes relative to the signal at the origin cluster.

One exemplary embodiment of a backscatter reader comprises one or more antennas and a microcontroller. The one or more antennas are configured to communicate with a plurality of backscatter tags by: (1) transmitting a carrier signal, and (2) receiving a combined signal that includes backscattered signals transmitted by the plurality of backscatter tags at least partly concurrently, wherein the backscattered signals are transmitted by the plurality of backscatter tags at respective offsets and transmission rates. The microcontroller is operable to process transmission logic configured to decode the receive the combined signal as follows. Edges are detected in the received combined signal based on in-phase (I) and quadrature (Q) signals corresponding to the received combined signal. Each of the detected edges is assigned to streams corresponding to the plurality of backscatter tags, based on one or more of the offsets and transmission rates of the plurality of backscatter tags. The streams of detected edges are decoded by assigning one of a plurality of values to each of the detected edges of the streams corresponding to the plurality of backscatter tags. The plurality of values correspond to the possible edge states of the detected edges.

In some embodiments, a backscatter tag comprises a transistor and one or more antennas configured as follows. A carrier signal is received from the backscatter reader. A backscattered signal is transmitted to the backscatter reader, the backscattered signal being made up of bits encoded into the carrier signal. The transmitting of the backscattered signal is triggered by the receiving of the carrier signal.

BRIEF DESCRIPTION OF DRAWINGS

This disclosure will be more fully understood from the following detailed description taken in conjunction with the accompanying drawings, in which:

FIG. 2B is a circuit diagram illustrating a portion of an exemplary embodiment of a backscatter tag;

FIG. 5A is a graph illustrating an exemplary embodiment of square waveforms corresponding to signals concurrently transmitted by two tags;

FIG. 6B(1) is a graph illustrating an exemplary embodiment of signal edges detected in an I channel signal corresponding to the transmitted signal of FIG. 6A;

FIG. 6B(2) is a graph illustrating an exemplary embodiment of signal edges detected in a Q channel signal corresponding to the transmitted signal of FIG. 6A;

FIG. 6B(3) is a graph illustrating an exemplary embodiment of illustrating the signal edges detected in the I channel and Q channel signals of FIGS. 6B(1) and 6B(2);

DETAILED DESCRIPTION

Figure 1:
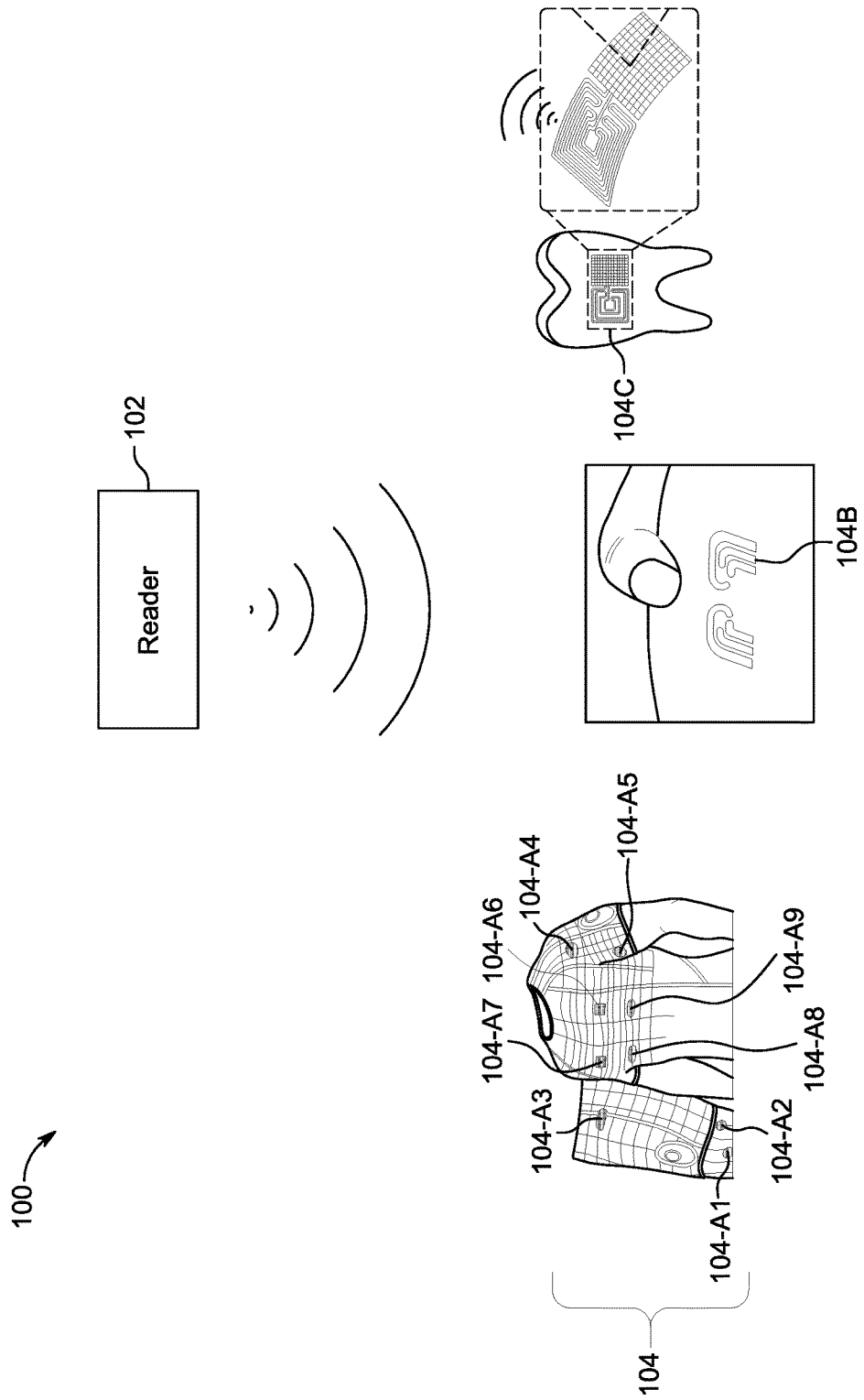
FIG. 1 is a schematic diagram of one exemplary embodiment of a computing device ecosystem for performing backscatter communications.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure. Further, in the present disclosure, like-numbered components of various embodiments generally have similar features when those components are of a similar nature and/or serve a similar purpose. Still further, to the extent electronic circuits and other diagrams are provided for in the present disclosure, a person skilled in the art, in view of the present disclosures, will understand a plethora of different ways by which the same purpose or functions can be achieved using different components and configurations of an electronic circuit. The illustrated circuits and other diagrams are in no way limiting of the types of set-ups that can be used to perform the various electronic functions, such as transmitting a signal, shifting a frequency of that signal, and receiving the frequency-shifted signal. Additionally, in a number of instances, various terms understood or otherwise known to those skilled in the art are used interchangeably, including, by way of non-limiting example, terms like "signal" and "wave."

The systems and methods described herein allow for multiple backscatter tags to concurrently transmit signals to a backscatter reader, while reducing or avoiding an increase in the resource requirements, and improving or maximizing transmission speeds. While traditional backscattering protocols enable tags to operate at low-power budgets, such protocols are not designed to allow for concurrent transmission from a variety of sensors (e.g., high-speed and low-speed sensors) that transmit data at different transmission rates. Instead, these protocols are designed such that transmit and receive rates are optimized for particular hardware configurations of the backscatter tags. Such an inflexible design results in high-speed tags underutilizing their potential rates and/or low-speed tags needing additional hardware and logic to meet the selected rates of the protocols. Either scenario results in unwanted increases in power requirements or decreasing overall throughput.

The described systems and methods allow backscatter tags to transmit data asynchronously and asymmetrically, meaning that the backscatter tags do not have to synchronize their transmissions with the backscatter reader (or each other) and can transmit signals at their respective selected transmission rates. This results in backscatter tags that transmit at respective optimal levels, and that do not require additional hardware or logic in order to meet the stringent transmission rates set by the protocol. Instead, a laissez faire (LF)-backscatter protocol is employed that shifts various computational burdens to the backscatter reader, including the decoding of signals and determining which tags transmitted which signals.

In this regard, the described systems and methods provide a backscatter reader that generates a carrier signal and transmits it to a plurality of backscatter tags. The backscatter tags can backscatter or reflect the signal, encoded with data, back to the reader, for example, at a respective time when each backscatter tag receives or identifies the carrier signal. In some embodiments, this results in backscatter tags that initiate transmissions at random and different times, also referred to as "offsets" that are measured from a common starting period (e.g., when the carrier signal is turned on by the backscatter reader. The data encoded in the backscattered signal can be any type of information but, in some embodiments in which tags are attached to sensors or are sensors themselves, the encoded data can be information sampled by the sensors. Because the backscattered signals are transmitted concurrently by multiple tags, meaning that they are sent and/or received even partially during an overlapping time period, the backscatter reader receives the backscattered signals as a single combined or collided signal.

Because the combined signal does not indicate which portion corresponds to which backscatter tag, the reader engages in a set of steps designed to separate the combined signal into distinct signals or streams corresponding to each of the backscatter tags, and decode the separated signals to identify the encoded information therein. To this end, the backscatter reader analyzes the received combined signal to detect edges therein. In some embodiments, edges refer to transitions caused by one or more backscatter tags toggling their transistors. Because at times the amplitude of the combined signal can remain constant due to the effects of the amplitudes of background signals, the backscatter reader detects edges using the in-phase (I) and quadrature (Q) signals corresponding to the combined signal. For example, the I and Q signals can be used to detect edge differentials caused by or resulting from one or more tags transmitting a 1 or a 0 bit. Once the edges corresponding to the combined signal have been identified, the backscatter reader assigns each of those edges to individual streams of edges corresponding to different backscatter tags. The reader can use the offset and transmission rate information corresponding to each of the tags in order to determine which tag caused each edge. For instance, an edge occurring at a time equal to the offset of a backscatter tag can be determined to correspond to that tag.

At times, two tags can toggle their transistors at the same time, causing their signals or edges to collide in the received combined signal. As a result, the reader may initially be unable to determine which tag that edge (or set of collided edges) corresponds to. The backscatter reader can identify these edge collisions and resolve them by either (1) causing the tags to retransmit the collided signals, or (2) separate the collided signals. Detecting collided edges can be performed by analyzing the IQ plot corresponding to the combined signal to identify clusters therein. Each cluster represents an edge or edge state of the combined signal. In cases in which there are no collisions, each edge corresponds to a state transition of a single backscatter tag. Thus, the number of clusters on the IQ plot is equal to the number of possible states (or fewer). On the other hand, when edges collide, the number of possible states or values of each edge increases because a colliding edge can include the values of multiple tags. If the number of clusters identified in the IQ plot therefore exceeds the number of possible edge states of a single non-colliding edge, it can be deemed that an edge collision exists in the combined signal.

Causing the backscatter tags to retransmit the collided signals can resolve the collision because the offsets that dictate when each tag begins its transmission are randomized and therefore likely to result in signals that are transmitted at different times than the times that caused their collisions. Otherwise, it is possible to resolve the collision by separating the signals. To separate colliding signals, the reader determines the set of states that are represented by each cluster and, in turn, determines the group of clusters that correspond to a tag and the states of those clusters that correspond to the tag. This information enables the reader to separate one signal from another colliding signal. The distinct signals corresponding to each of the tags can then be decoded edge by edge, based on the determined edge differentials, to obtain the data originally encoded in the backscattered signals.

Backscatter Communication Ecosystem

FIG. 1 illustrates an exemplary embodiment of a backscatter communication ecosystem 100 in which the present disclosures related to asymmetric backscatter communication protocols can be used. The ecosystem 100 includes various objects or devices configured to collect, gather, or otherwise generate data, and transmit that data to one or more other locations, objects, and devices that are configured to receive and decode that data. It should be understood that the computing device ecosystem 100 can include any number and type of interconnected computing devices or other devices and/or locations (e.g., the cloud) capable of collecting, gathering, otherwise generating, transmitting, reading and decoding data. For example, the ecosystem 100 can refer to the Internet of Things (IoT), a home network, an office network, or any set of interconnected computing devices.

In the illustrated exemplary computing device ecosystem 100, data is transferred wirelessly, although in some instances, objects or devices in a computing device ecosystem can have a wired communication configuration. The computing devices in the ecosystem 100 can include devices that are capable of transmitting, receiving, or both transmitting and receiving data. These devices can be include computing devices, smart devices, readers, sensors, and/or sensor-equipped devices. In some examples, although a particular component (e.g., smart computing device) of a computing device ecosystem is capable of both transmitting and receiving data, only one of those functionalities may be operational at a given time to achieve improved or peak performance.

As shown in FIG. 1, the illustrated devices include a reader 102 and a set of tags 104 (sometimes referred to as a backscatter reader and backscatter tags, respectively), which are described in further detail below. The tags 104 are configured to transmit data to the reader 102, for example, using backscattering or backscatter communications, in which the tags 104 reflect signals to the reader 102, which in turn decodes the received signals.

The tags 104 illustrated in FIG. 1 can be provided on (e.g., attached to) virtually any physical item, including, for instance, people, appliances, automobiles, airplanes, buildings, and on virtually any surface, including plastic, metal, skin, teeth, fabric, and more. In some embodiments, each of the tags 104 are associated with or embedded in one or more sensors, including any number and type of lower-energy sensors such as on-body sensors, miniature implantable sensors, thin and flexible wearables, and others known to those of skill in the art. Illustrative examples of commonly used sensors include accelerometers, gyroscopes, temperature sensors, bioimpedance sensors, optical sensors, and cameras. Each sensor is configured to measure and collect data and different parameters of the physical object on which the sensor is provided, and/or of their surroundings. Moreover, the sensors can be embedded or incorporated in components and electronic computing devices such as activity trackers, smartphones, smartwatches, tablets, smart devices and the like.

Still with reference to the sensors with which the tags 104 of FIG. 1 are associated, each of the sensors can include any of: (1) a sensing unit configured to perform the sensing, measuring and/or data collecting for the sensor; (2) a processor including logic; (3) communications means (e.g., an antenna); and (4) a power source. As described in greater detail below, a power source can be an electromagnetic field from another portion of the ecosystem 100, such as a reader 102 and/or another device (not illustrated) that is configured to send a carrier wave to the respective tag(s) 104. It should be understood that, in some embodiments, the sensors 104 themselves can be the tags 104, such that a sensor can be a backscatter tag configured to engage in backscatter communications that employ the backscatter protocols described herein.

For instance, a tag can be provided on an accelerometer sensor, which can be embedded in a soccer ball. The accelerometer measures, collects and/or tracks data regarding the movement, velocity and position of the soccer ball. Similarly, a temperature sensor provided on a shirt can be used to measure, collect and/or track the temperature of the shirt or the individual wearing the shirt. In some embodiments, the sensors can further analyze and manipulate the data to generate new or additional data. The data that is collected and/or generated by the sensors can be transmitted to the reader 102 via their corresponding tags 104, using backscatter communications and protocols described herein, for example. In some embodiments, the data is transmitted to the reader 102, which typically has or is communicatively coupled with more computing resources (e.g., memory, processor, etc.) than the tags 104, to store and/or process the data. A person skilled in the art will recognize other types of physical items and surfaces on which tags can be provided. Moreover, a person skilled in the art will recognize other types of sensors and electronic computing devices on which tags and sensors, respectively, can be provided.

In some embodiments, the tags 104 can be RF tags, or RF identification (RFID) tags, although it should be understood that a person of ordinary skill in the art will recognize other types of tags or backscatter tags that can be used. Moreover, as described in further detail below, each of the tags 104 can include one or more of: (1) an integrated circuit for storing, processing, modulating, and/or demodulating a signal; (2) an antenna for receiving and transmitting a signal; (3) a transistor coupled to the antenna; (4) a modulator or transmission logic; and (5) a low-power oscillator. In backscatter communications, one of the tags 104, for example, receives a carrier signal from a device, such as the reader 102 and, in turn, the receiving tag 104 reflects the received signal to the reader 102. In some embodiments, the reader 102 (and/or a device transmitting the carrier signal to the tag 104) can provide an electromagnetic field to the tag 104 for use to both power the tag and for the tag to use as a communication medium.

As discussed above, the tags 104 can be provided on virtually any physical item or surface. For example, in FIG. 1, the tags 104 include tags 104-A1 to 104-A9 (collectively "tags 104A") that are embedded in or otherwise associated with apparel, namely an athletic shirt and pants, to create biometric clothing. In some embodiments, the tags 104A can be or function as sensors themselves, or can correspond or be attached to various sensors provided on or with the apparel. Although various types of sensors can be provided on the apparel, one illustrative example is an accelerometer configured to measure information regarding a players position and velocity relative to a certain position or area, such as a field of play, and another illustrative example is heart rate monitor or other sensor capable of making biometric one or more measurements. Moreover, the tags 104 illustrated in FIG. 1 include (1) tag 104B, which is a sensor tattoo that can be adhered to a person's skin, and (2) tag 104C, which is a tooth sensor adhered to a patient's tooth. A person of ordinary skill will understand the various types of sensors, collectable data, and uses for the collected data that can be provided.

The data collected by sensors is transmitted to the reader 102 via the tags 104. The reader 102 is configured to receive data from the tags 104 and decode the received data. More specifically, in backscatter communications, the reader 102 communicates wirelessly with the tags 104 by transmitting and receiving radio waves or radio frequency (RF) signals. As explained in further detail below, the reader 102 generates a carrier signal and transmits it to one of the tags 104. The receiving tag 104 reflects the signal back to the reader 102.

The reader 102 can be a stationary (e.g., fixed) or mobile (e.g., handheld) device, and can be stand-alone or incorporated in another device. One illustrative example of a stand-alone reader is a radio frequency identification (RFID) reader that uses radio-frequency waves to wirelessly communicate with RFID tags located or positioned within an operable distance from the RFID reader. Incorporated readers refers to (1) readers (e.g., RFID readers) that are embedded or included in other devices, and (2) devices that use their existing radios and radio functionalities to function as readers. For instance, devices that are equipped with Wi-Fi, Bluetooth, Bluetooth Low Energy (BLE), Zigbee, Z-Wave, and other similar radios and radio functionalities (e.g., protocols) can leverage these to engage in backscatter communications with the tag(s) 104. Non-exhaustive examples of devices that can have readers incorporated or integrated therein include smart automobiles, roads, buildings, vending machines, personal computers (e.g., tablets, desktops, laptops), mobile devices (e.g., smartphone (e.g., iPhones and Android phones)), wearable devices (e.g., activity tracker or fitness band (e.g., Fitbits® and Misfit Shines); smartwatch (e.g., Apple Watches and Samsung Gear watches)) and other smart electronic devices. A person skilled in the art will recognize other types of "smart devices" that exist and can be used in conjunction with the present disclosures in the capacity of a transmitter and/or a receiver. Other exemplary backscattering devices and configurations are described in PCT Application No.: PCT/US2017/040086, filed on Jun. 29, 2017 and titled "Systems, Devices and Methods for Providing Power-Proportional Communication," the content of which is incorporated herein by reference.

Although not illustrated in FIG. 1, the reader 102 and/or the device in which the reader 102 is incorporated includes or is communicatively coupled to one or more processors or microcontrollers, memories, radios, antennas and other hardware and components to allow for wireless communication with other devices of the ecosystem 100, including the tags 104. In some embodiments, the reader 102 is embedded in a computing device that can collect data received from the tags 104 for further processing. The computing device in which the reader is embedded can include computational power that allows for processing of data beyond the capabilities of the tags 104.

Figure 2A:
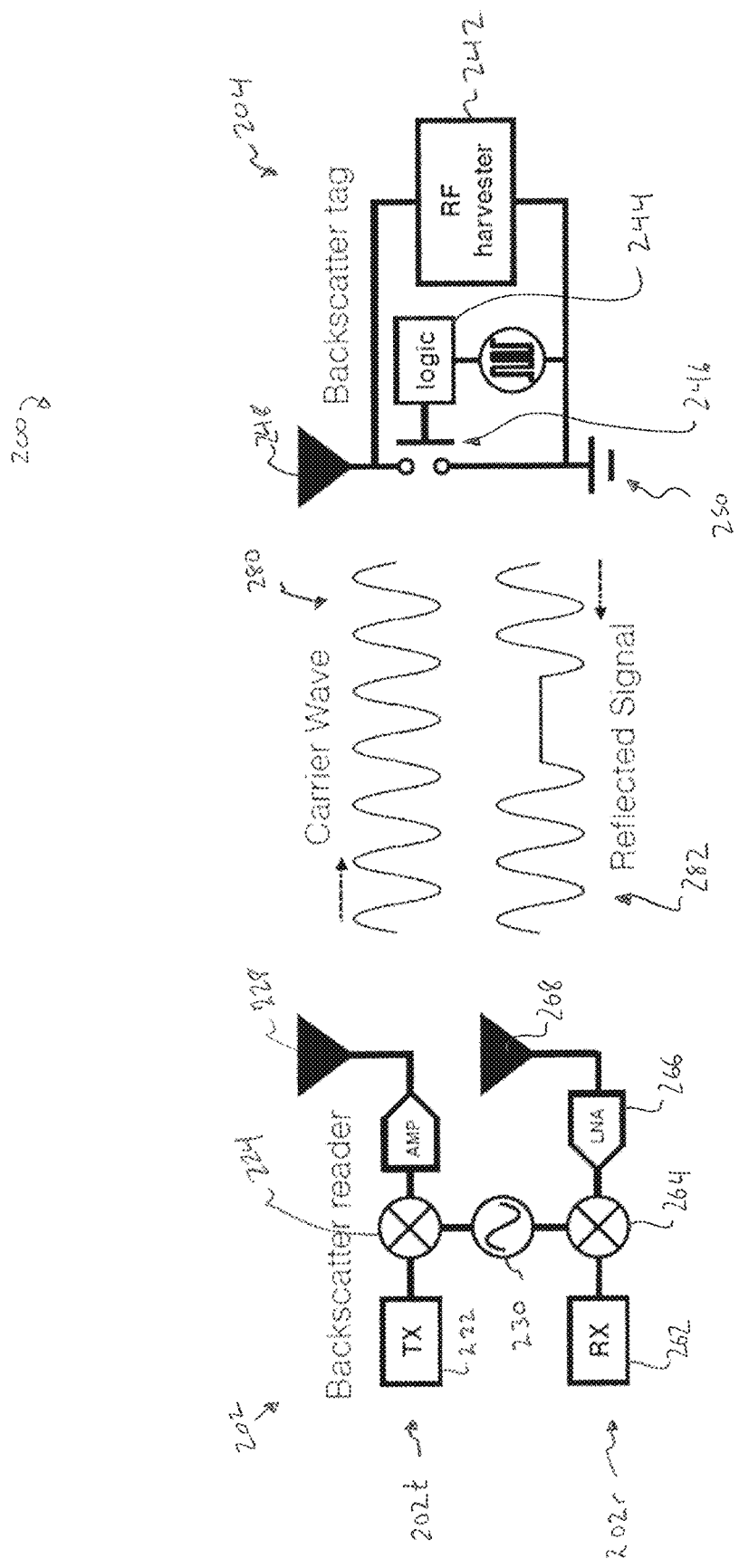
FIG. 2A is a schematic electronic diagram of one exemplary embodiment of a backscatter reader and a backscatter tag.

FIG. 2A illustrates a system 200 that includes a backscatter reader 202 and a backscatter tag 204. The backscatter reader 202 is designed to be both a transmitter and a receiver, although in other illustrated embodiments these functions can be separated into two separate devices. In the illustrated embodiment, a transmission portion 202t serves as a transmitter and a receiver portion 202r serves as a receiver. Further, the backscatter reader 202 can provide an electromagnetic field to the backscatter tag 204, which the tag uses for both power and as a communication medium. That is, the energy contained in the incoming electromagnetic field can be used to draw energy and can be partially modulated and reflected back to a receiver, thereby communicating information. As a result, the backscatter tag 204 does not require a separate power source, thus allowing the backscatter tag 204 to be small in comparison to sensors and tags that require an on-board power source to be operational.

The transmission portion 202t of the backscatter reader 202 includes a transmitter 222, a lamp 224, and amplifier 226, and an antenna 228, and a receiver portion 202r of the reader 202 includes a receiver 262, a lamp 264, a low-noise amplifier 266, and an antenna 268. The transmission portion 202t and the receiver portion 202r are connected to a sinusoidal generator 230. Meanwhile, the lamps 224, 264 are used to indicate whether the transmission portion 202t or the receiver portion 202r are currently being used. Typically only one or the other portion 202t, 202r is operated at a time to achieve peak performance of that operating portion of the backscatter reader 202. In use, the transmitter 222 can transmit a signal that is representative of data. The data can be measured by some sensor (not shown) associated with the reader 202, or it can otherwise be provided to the reader 202. The signal is sent across the lamp 224, to the amplifier 226, where the signal is amplified. The amplified signal is transmitted to a location beyond the reader 202 via the antenna 228 in the form of a sine wave. The transmitted signal is illustrated as a carrier wave 280, and, as shown, is transmitted to the backscatter tag 204. Sometimes the transmitted signal is referred to as an incident signal, a carrier signal, and/or an incident carrier signal, among other terminology known to those skilled in the art.

The backscatter tag 204 includes one or more of an antenna 248, a radiofrequency (RF) harvester 242, transmission logic 244, a push button or momentary switch 246, and a radiofrequency transistor 250, and is generally designed to reflect (also referred to as transmit in the present disclosure) the received signal to a receiver (as shown, the receiver portion 202r of the backscatter reader 202) after conditioning the signal in some manner. The tag 204, as with all of the backscatter tags provided for herein, is configured to use backscatter modulation and electromagnetic coupling to enable far-field coupling relative to near-filed communication mechanisms. The backscatter tag 204 receives the signal of the carrier wave 280 by way of the antenna 248, which can be operatively connected or coupled to the RF transistor 250. The RF harvester 242 can harvest energy from the electromagnetic field created by the reader 202 to help power the backscatter tag 204. The transmission logic 244 toggles the transistor 250, by way of the switch 246, based on the data that is transmitted and to embed information, such as data measured or otherwise provided by the tag 204, on top of the reflected signal. The transistor 250 can be configured to transmit a signal across any frequency band, and the decision at which band to transmit can depend, at least in part, on the band in which the incident carrier signal was transmitted, any existing interference that exists in other channels, and regulations established by a location where the transmission is occurring (e.g., country wireless transmission regulations). Because the backscatter tag 204 merely reflects the incident signal, the tag consumes three to four orders of magnitude less power when compared to direct wireless signal transmission, thus enabling the tag to transmit data at extremely low power (e.g., 50 microwatts or less).

The reflected signal, illustrated as a carrier wave 282, is transmitted back to the backscatter reader 202. In alternative embodiments, the reflected signal is transmitted to a receiver associated with a device or component that is separate from the device or component that transmitted the incident carrier signal, as described in further detail in U.S. patent application Ser. No. 15/631,142, filed on Jun. 23, 2017 and titled "Systems and Methods for Backscatter Communication," the content of which is incorporated herein by reference in its entirety. In the illustrated embodiment, the receiver portion 202r receives the reflected signal via the antenna 268, and passes it through the low-noise amplifier 266 so that the reflected signal can be amplified before reaching the receiver 262. The signal is sent across the lamp 264, which can be lit to indicate the receiver portion 202r is in operation, and delivered to the receiver 262. The receiver 262 can read the received, reflected signal and process the associated data in any known manner. For example, the receiver 262 can display the data and/or use the data to trigger some particular action in response to the data.

A person skilled in the art will recognize at least some of the components illustrated in the electronic circuit diagrams of FIG. 2A are optional and/or can be replaced by other components. By way of non-limiting example, the lamps 224, 264 can be removed in some instances.

FIG. 2B is a circuit diagram illustrating a portion of an exemplary backscatter tag 204". As shown in FIG. 2B, the backscatter tag 204" receives an RF input, for example, sent as a carrier wave or signal from a backscatter reader. The RF input is passed through a passive resistor 280 and a capacitor 282 to remove high-frequency signals. A comparator 284 compares the resulting signal voltage with a threshold voltage, and outputs the difference between the two signals, which can in turn be transmitted to the backscatter reader.

Figure 2C:
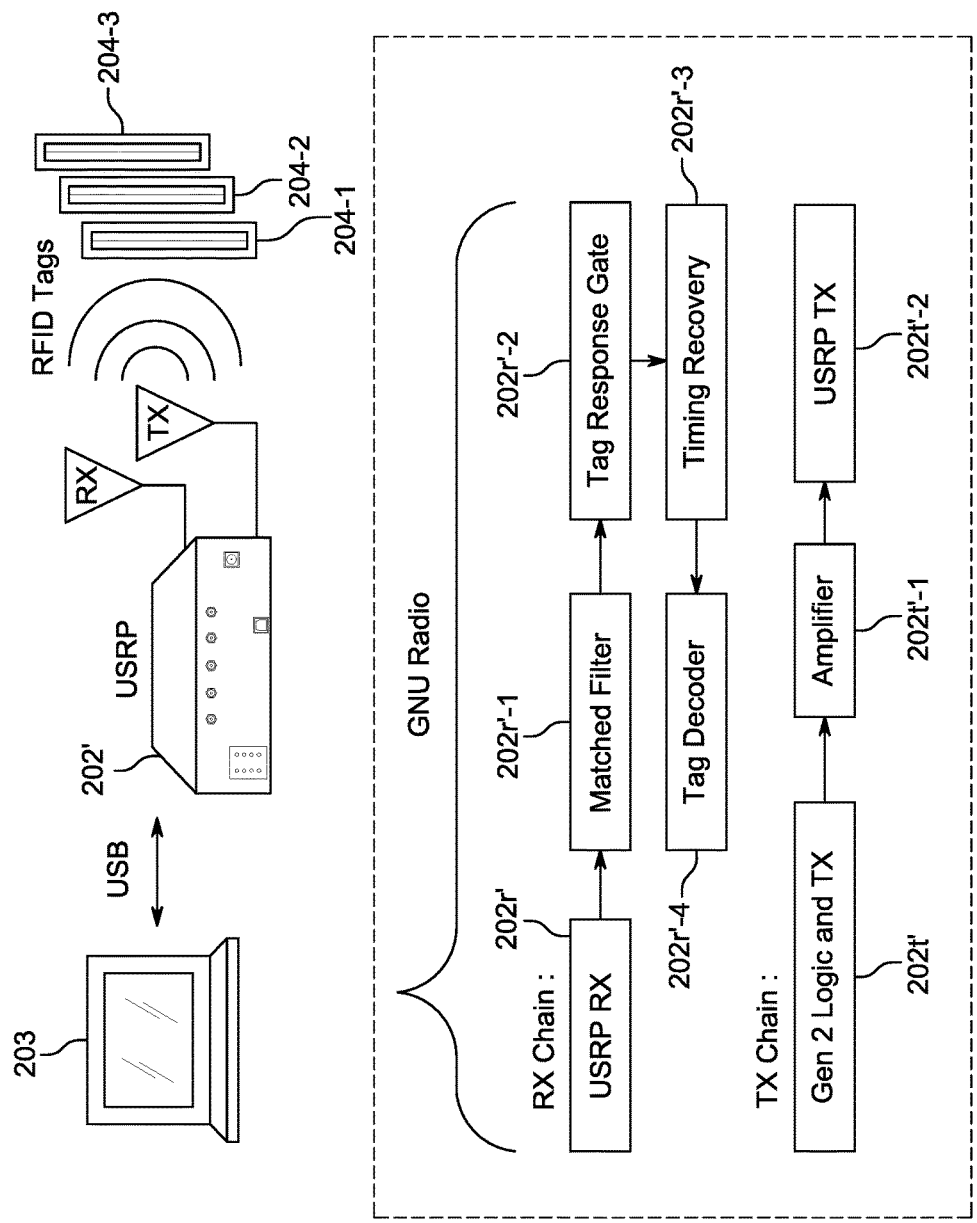
FIG. 2C illustrates exemplary types of systems in a backscatter communication ecosystem.

FIG. 2C illustrates exemplary types of systems in a backscatter communication ecosystem. One illustrative example of a backscatter reader is a Universal Software Radio Peripheral (USRP) backscatter reader 202', built based on the USRP N210 software radio reader that enables bit-by-bit backscatter communication in severe energy harvesting environments. USRP is a range of software-defined radios. The exemplary USRP backscatter reader 202' includes, in some embodiments, SBX RF daughterboards and Cushcraft 900 MHz antennas. USRP is a general-purpose RF front-end for software radio development with an effective complex sampling rate of approximately 8 mbps. In some embodiments, USRP interfaces (e.g., via USB) with a computing device 203 such as a standard Linux PC where signal processing is performed. The daughterboards of the reader 202' convert RF signals to and from baseband where an ADC and DAC are used to transform the signal from analog to digital and vice versa. Signal processing can be implemented within a GNU Radio framework, which is a software library and runtime system developed as a counterpart to the USRP that provides the signal processing runtime and processing blocks to implement software radios using readily available, low-cost, external RF hardware and commodity processors. Applications that tie signal processing blocks, modules or logic (described in further detail below) together can be implemented, for example, as user-level Python programs and signal processing blocks, modules or logic (described in further detail below) can be implemented, for example, in C++.

FIG. 2C illustrates a simplified block diagram of the backscatter reader architecture. The Gen 2 Reader block 202t' implements the Gen 2 state diagram and generates the on/off keyed reader commands for transmission. Commands can then be sent to a configurable amplifier 202*t*'-1 and sent to the USRP transmitter hardware 202*t*'-2 for transmission.

The first GNU Radio block in the receive chain is the "USRP RX" block 202*r*', which pulls received samples in from the computing device (e.g., from the Linux kernel) 203 and feeds them to the next module in the flowgraph of FIG. 2C. That is, the received samples are passed through a "matched filter" 202*r*'-1, which is configured to maximize the signal-to-noise ratio (SNR) of tag transmissions. The filtered signal is then sent to the "tag response gate" 202*r*'-2, which acts as a signal gate, ungating the incoming signal when a tag response must be decoded. This reduces computational requirements, as dock recovery and tag decoding are executed when a tag response is expected, which reduces overall system latency. When ungated, the signal is passed through a clock recovery block ("timing recovery" 202*r*'-3) which resamples the tag response and outputs one sample per subcarrier cycle. The "tag decoder" 202*r*'-4 then detects the preamble and demodulates the ASK modulated tag transmission. After the response is decoded, a message is sent to the Gen 2 reader block along with the decoded hits, which triggers the reader to send out the next command. The SEX daughterboard has two RF interfaces where one (TX/RX) of them can be configured for either transmission or reception and the other (RX2) can be configured for reception. The sampling rate at the reception antenna is set as 25 MHz.

The backscatter tags or nodes 204-1, 204-2, and 204-3 are UMass Moo backscatter nodes (hereinafter referred to as "Sample (WISP)") that operate in the 902 MHz~928 MHz band, as described for example in H. Zhang et al., Moo: A battery less computational rfid and sensing platform, University of Massachusetts Computer Science Technical Report UM-CS-2011-020, 2011; A. P. Sample et al., Design of an RFID-based battery-free programmable sensing platform, IEEE Transactions on Instrumentation and Measurement, 57(11):2608-2615, November 2008, the contents of which are incorporated by reference herein in their entireties.

In some embodiments, the backscatter tags include an antenna and an impedance-matching circuit preceding the analog front end. A power harvester rectifies the incoming RF energy into de voltage to power the system. The demodulator follows the envelope of the RF carrier waver to extract the amplitude-shift-keyed (ASK) data stream. This extracted baseband waveform is read by the MSP430 microcontroller (MCU) to receive downlink data from the reader. Uplink data is sent via the modulator circuit, which functions by changing the antenna impedance. Finally, onboard sensors can be powered and measured by the MCU. The WISP analog front end can differs from other RFID tags due to the relatively high power consumption of WISP, and because the rectifier is designed to supply more current than other tags. This circuit is excited by commercial EPC Class 1 Generation 1 compliant readers operating at 902-928 MHz with an allowable transmission power of 4 WEIRP (effective isotropic radiated power). In some embodiments, the backscatter tags can have 8 MHz oscillators to be able to decode at higher speeds, as well as a clock having a drift of approximately 150 ppm.

Figure 2D:
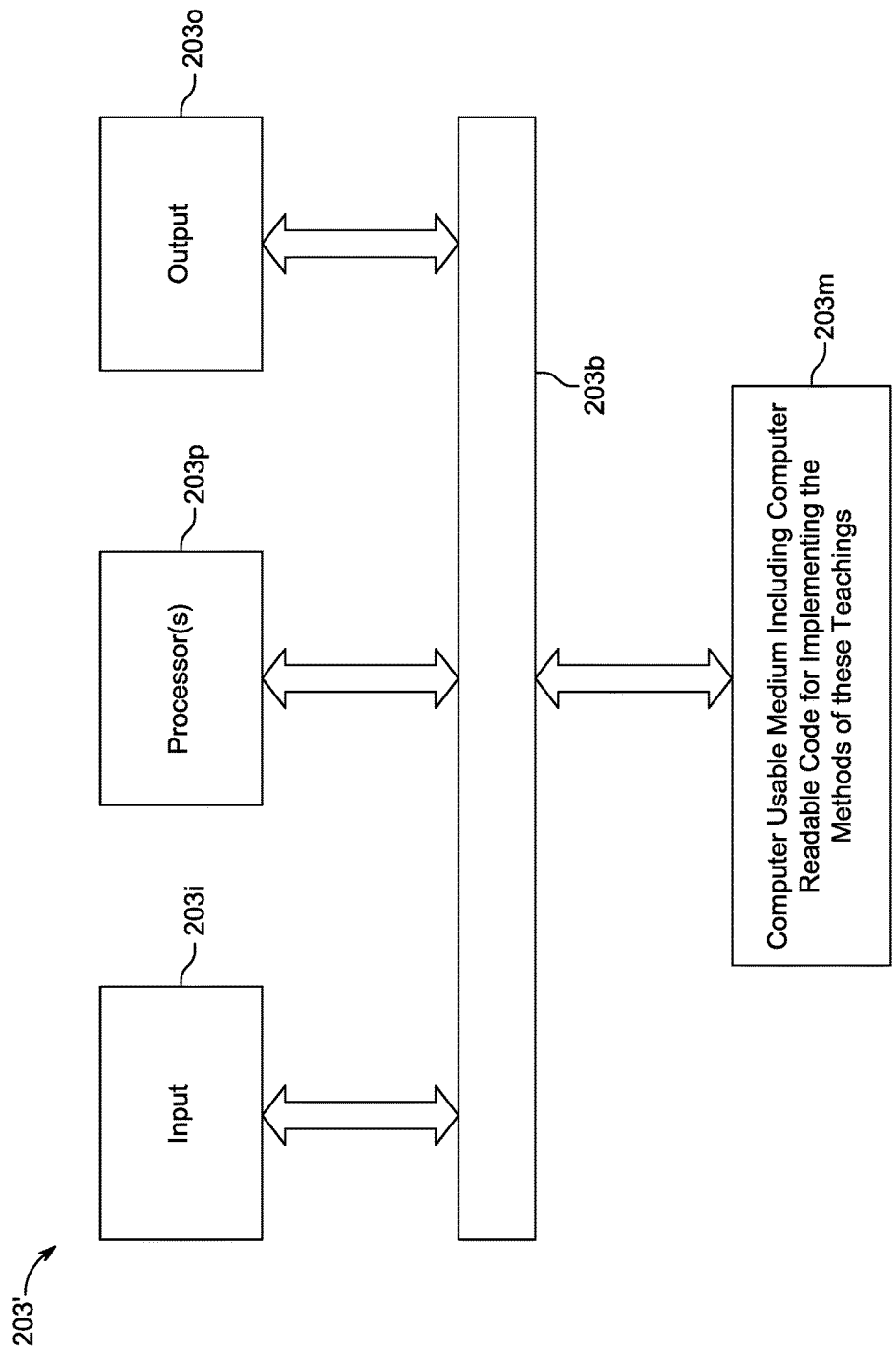
FIG. 2D is a schematic diagram illustrating one exemplary embodiment of a computer or computing device in a backscatter communication ecosystem.

FIG. 2D is a schematic diagram illustrating one exemplary embodiment of a computer or computing device 203' in a backscatter communication ecosystem. The computer 203' can include one or more processors 203*p* that are operatively connected to computer usable media 203*m* that has computer readable code embodied or stored therein. When executed by the one or more processors 203*p*, the code causes the one or more processors 203*p* to perform the method of the backscatter methods described herein. An input component 203*i* and an output component 203*o* are also operatively connected to the one or more processors 203*p* so that a controller component can communicate with other components. The one or more processors 203*p*, the computer readable media 203*m* and input and output devices 203*i* and 203*o* are operatively connected by means of a computer connection component 203*b* (e.g., a computer bus).

Backscatter Communication Protocols

As described in further detail above with reference to FIG. 1, sensors are increasingly being used to create "smart" "things," (e.g., objects and people) including, for example, electronic devices, automobiles, homes, machines, cities, buildings, grids, plants, and the like, that can provide benefits such as connectivity and automation. To this end, a wide variety of sensors are employed to collect a large amount and variety of data. Often, these sensors and/or the devices in which they are embedded (e.g., wearables (e.g., smartwatch)) are small and mobile, and thus have a low power supply. To this end, low power radios and technologies, such as Bluetooth Low Energy (BLE), Zigbee and Z-Wave have been developed to reduce the amount of power required for sensors and/or devices to communicate. Backscatter is another communication technology that requires ultra-low power consumption.

In backscatter communications, a reader generates a carrier signal and transmits it to a tag. The tag, in turn, reflects or "backscatters" the signal back to the reader, thereby sending information back to the reader. The information is sent by modulating the state of the antenna (e.g., between matched and shorted). In this way, in backscatter communications, tags do not have to generate the carrier wave, which is a significant power burden. Instead, the carrier wave is generated by the reader, resulting in minimal power consumption and requirements by the tag. For instance, a backscatter-based temperature sensor or device that samples at 1 Hz and operates in a sense-transmit loop can consume approximately 10 uW of power (even, in some embodiments, during periods of continuous transmission), thereby enabling the continuous operation of that sensor using a small amount of power. By comparison, traditional transmitters such as the CC2541 and CC2640, for example, consume approximately 20 to 60 mW during continuous transmission periods. As a result, such transmitters often function in small duty or short cycles in order to reduce power consumption, resulting in delays (e.g., in the order of seconds) and low effective throughput (e.g., less than approximately 2 Kbps). Notably, this reduction in power consumed by tags that is facilitated by the use of backscatter also enables an increase in throughput. High-speed and ultra-low power radios facilitate the concurrent use of a variety sensors, including data-rich sensors such as cameras and microphones, which have fast sampling and transmission rates.

Backscatter protocols are therefore designed to enable a reader to simultaneously communicate with multiple tags that have different sampling and transmission rates. To this end, existing protocols are optimized, and therefore stringently constrained, to function with specific types of sensors. For instance, some protocols are optimized to function with high-speed sensors that transmit data at high bitrates (e.g., hundreds of Kbps). Such a protocol requires low-rate sensors (e.g., temperature sensors) to accumulate samples in a buffer and/or to use a high-speed clock to toggle its RF transistor as dictated by the protocol. The employment of buffers and/or clocks increases the power consumption and requirements of the sensor, thereby minimizing the benefits of using backscatter. On the other hand, optimizing the protocol for low-rate sensors by reducing the bitrate of the protocol impairs the throughput of higher-speed sensors, which likewise minimizes the benefits of using backscatter. Examples of existing backscatter protocols for supporting communications between a reader and multiple tags, including tags having different throughput and sampling rates, are now described in further detail. These exemplary protocols use amplitude shift keying (ASK) modulation to provide continuous power to the tags. A person skilled in the art will recognize other techniques that can be employed in conjunction with the novel protocols provided for herein without departing from the spirit of the present disclosure, including modulation techniques such as frequency shift keying (FSK) and quadrature amplitude modulation (QAM), for example.

Backscatter Methods

Multiple Access Protocols

Time Division Multiple Access (TDMA) is an existing protocol that allows the reader, which contains more resources than the tags, to coordinate the transfer of data by estimating the number of tags with which it is to communicate. Based on this information, the reader divides a given amount of time into slots equal to the number of estimated tags with which it is to communicate. Each tag is assigned a slot of time during which the tag can transmit data to the reader.

If the TDMA protocol is designed to operate at a rate that is the lowest common denominator among the tags (e.g., the transmission rate of the slowest one of the tags), the overall throughput of the communications between the reader and the tags suffers, as the higher speed tags are forced to transmit at a slower, less-than-optimal rate. On the other hand, if the protocol is designed to function at a faster rate in order to improve throughput, tags that are not configured to transmit at those rates are required to employ more power-hungry components such as clocks and buffers, disadvantageously increasing the tags' requisite power supplies. Moreover, the need for additional buffers and clocks in tags increases their hardware complexity, thereby impeding the ability to reduce the size and cost of tags.

Additionally, the TDMA protocol issues periodic control messages to tags, for example, to manage their transmissions and avoid collisions between such transmissions. These control messages further strain the overall throughput of communications between a reader and multiple tags, and results in additional power consumption by the tags due to additional tasks, including receiving and processing the control messages. And, because transmission by the tags are serialized, the available sampling rate of the reader is underutilized, limited by the sampling of merely a single tag at a given time.

Code Division Multiple Access (CDMA) is another existing protocol. It enables concurrent transmission of data from tags to a reader. Each tag uses a code (e.g., orthogonal code) for encoding data such that each bit in the data is converted to a long pseudo noise (PN) code sequence (e.g., of hundreds of bits in length). Because the pseudo random codes for the tags are mutually orthogonal, the reader can use that orthogonality to distinguish between multiple tags and their incoming messages. However, because the encoded data is much larger than the original, unencoded data, the data transmission of the encoded data is much less efficient, thereby negatively impacting the reader-tag throughput. Alternatively, to negate the impact of the larger data transmission, the tags can be configured to operate at higher frequencies, thereby increasing their power consumption and requirements.

Linear Signal Separation (Buzz)

Linear signal separation, referred to by those skilled in the art as Buzz, is an existing backscatter protocol that enables concurrent transmission to a reader from multiple tags. The Buzz protocol separates signals using matrix inversion methods. Buzz allows tags to transmit data in a synchronous bit-by-bit manner such that the received signal can be expressed as shown in exemplary Equation 1 below:

$$y = d_{m \times n} h_{m \times n} b_{n \times 1} \quad (1)$$

$$= \begin{pmatrix} d_{11} & \cdots & d_{1n} \\ d_{21} & \cdots & d_{2n} \\ \vdots & \ddots & \vdots \\ d_{m1} & \cdots & d_{mn} \end{pmatrix} \begin{pmatrix} h_1 & 0 & \cdots & 0 \\ 0 & h_2 & \cdots & 0 \\ \vdots & \vdots & \ddots & \vdots \\ 0 & 0 & \cdots & h_n \end{pmatrix} \begin{pmatrix} b_1 \\ b_2 \\ \vdots \\ b_n \end{pmatrix}$$

In Equation 1, y, the received symbol at the reader, is a linear combination of the complex channel coefficient corresponding to tag i, $h_i$, the bit being transmitted by the tag, $b_i$, and a randomization matrix, $d_{ij}$. Once the randomization matrix and the channel coefficients from each tag are known, the function can be inverted to estimate the bits transmitted by each tag. To do so, the Buzz protocol first determines the channel coefficients of each tag by using compressive, sensing-based estimation. Once the channel coefficients are known, tags transmit their bits in lock-step, re-transmitting each bit multiple times with different random combinations as determined by a pre-defined random matrix $d_{m \times n}$. This allows the decoder to observe different combinations of the concurrent transmissions, enabling it to decode the stream. Once a combination with low error is determined, tags move on to transmit the next message.

The Buzz protocol however requires that tags transmit their bits in lock step. In other words, this protocol requires that concurrently transmitting tags have clocks that operate at the same rate. Such a requirement, however, is unrealistic for sensors that transmit data at varying rates, such as a camera that has a transmission rate that can exceed a million times more than that of a temperature sensor. Configuring sensors to transmit at the same rate would undesirably reduce the throughput of high-speed sensors, and/or undesirably increase the power burden of low-speed sensors.

Figures 3A, 3B, 3C:
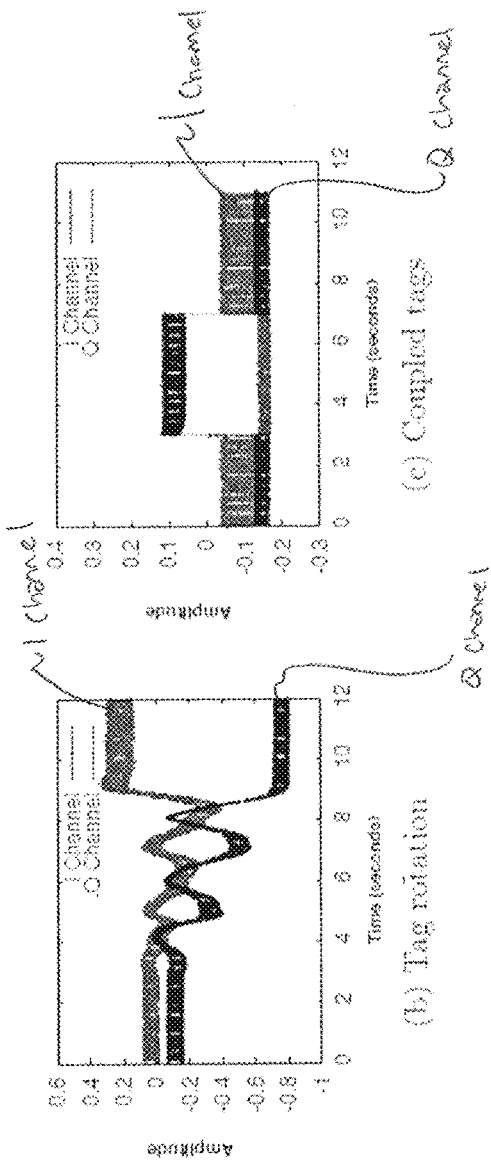
FIG. 3A is a graph illustrating one exemplary embodiment of changes to signals in the in-phase (I) channel and quadrature (Q) channels, caused by people moving proximate to a stationary reader during a signal transmission.
FIG. 3B is a graph illustrating one exemplary embodiment of changes to signals in the I channel and Q channel, caused by rotating the orientation of a tag during a signal transmission.
FIG. 3C is a graph illustrating one exemplary embodiment of changes to signals in the I channel and Q channel, caused by moving two tags closer to one another during a signal transmission.

Moreover, the Buzz protocol does not adapt to dynamic environments of the tags. That is, because channel coefficients vary, they need to be re-estimated to deal with the changing environment and tag position. Channel coefficients can vary due to, for example: (1) moving objects in the vicinity of the tag; (2) moving tag; and (3) a near-field coupling between the antennas of two tags. FIG. 3A is a graph illustrating substantial changes to the channel coefficients of a stationary tag located in front of a reader while an individual moves around the reader or the room in which the reader is located. As shown, the amplitudes for the coefficients in the I and Q channels vary drastically over time as people move between the approximate window of time shown between about four seconds and about eight seconds. FIG. 3B is a chart illustrating substantial changes to the channel coefficients when a tag's orientation is varied by rotating it without displacing the tag. As shown, the amplitudes in the I and Q channels begin changing as the tags begin to rotate at about four seconds, and after rotation is complete at about nine seconds, the amplitudes are significantly different. Prior to rotation, the amplitude of the I and Q channel coefficients are within about 0.1 signal value of each other, while after rotation the amplitude of the I and Q channel coefficients are about 1.0 signal value apart, FIG. 3C is a chart illustrating substantial changes as the tags are moved with respect to each other. In the illustrated embodiment, the tags were place far apart (approximately one meter apart), and then they were brought closer tighter at about three seconds. As shown, both channel coefficient are substantially unchanged when the tags are about one meter apart, but as they are moved closer together (approximately five centimeters apart), there is near-field coupling across the antennas of the tags, which results in variations of channel coefficients. As they continue to be brought closer together, the I and Q channel coefficient revert to their original values, as shown at about seven seconds. A person skilled in the art will understand that with any of these three illustrations, the results depend on a variety of factors, including but not limited to the dynamics in the environment, the circuitry associated with the I and Q channels, and the types of movement that actually occur. Regardless, adapting to them will incur protocol overhead for channel estimation prior to communication, and associated tag complexity for supporting the protocol functions. Not only does the Buzz protocol fail to adapt to these changing dynamics at least because it targets one-shot RFID identification, but making such adaptations would undesirably require additional tag resources to perform channel estimation and to support these additional protocol functions.

Laissez-Faire (LF) Backscatter Protocol

A backscatter protocol (referred to herein as "LF-backscatter") for providing concurrent communications between heterogeneous sensors and a reader is now described. Traditionally readers have powerful hardware that can sample at significantly faster rates than tags can modulate the signal. As an non-limiting illustrative example, a reader can read data from backscatter tag at a rate of approximately 25 mbps, while a tag can transmit at a maximum rate of approximately 100 kbps. Under this exemplary scenario, less than 1% of the time-domain samples read by the reader contain actual useful information (e.g., data intended to be transmitted by the tag).

As described in further detail below, the LF-backscatter protocol is not optimized based on hardware specifications such as the maximum or minimum sampling or transmission rates of tags. Instead, the LF-backscatter protocol allows tags to transmit data blindly at each a desired rate of each tag (e.g., when each tag receives a respective carrier signal). In other words, the tags do not coordinate or synchronize with the reader prior to transmitting signals such that the communication of each tag with the reader is deemed to be asynchronous. The LF-backscatter protocol instead shifts the burden to the more resource-powerful component in the backscatter communication, namely the reader, to decode the streams concurrently transmitted by and/or received from various heterogeneous tags. The LF-backscatter protocol described herein thus enables the design and configuration of tags that require extremely small amounts of power because they are virtually free of any computational logic that is often required when using other backscatter protocols such as those described above. More specifically, the tags are said to be virtually free of computational logic because they are designed to merely sense and transmit signals without regard for other tags or other wireless traffic, thus allowing such transmission to occur immediately or substantially immediately. This is due to the tags requiring no buffer or packet processing, but being merely limited by any delay caused by signal propagation on the corresponding PCB board and/or the time for the on/off switch to transition states, all of which can, in some embodiments, result in tags that begin transmitting in less than approximately 10 ns. Less computational logic means that tags can be designed with less complexity because the need for additional hardware such as buffers, high-speed oscillators, and the like is reduced or even eliminated. The LF-backscatter protocol therefore enables high-speed backscatter tags to transmit data at their desired maximum rates without needing to pause and wait from slower tags to transmit their data.

Figure 4:
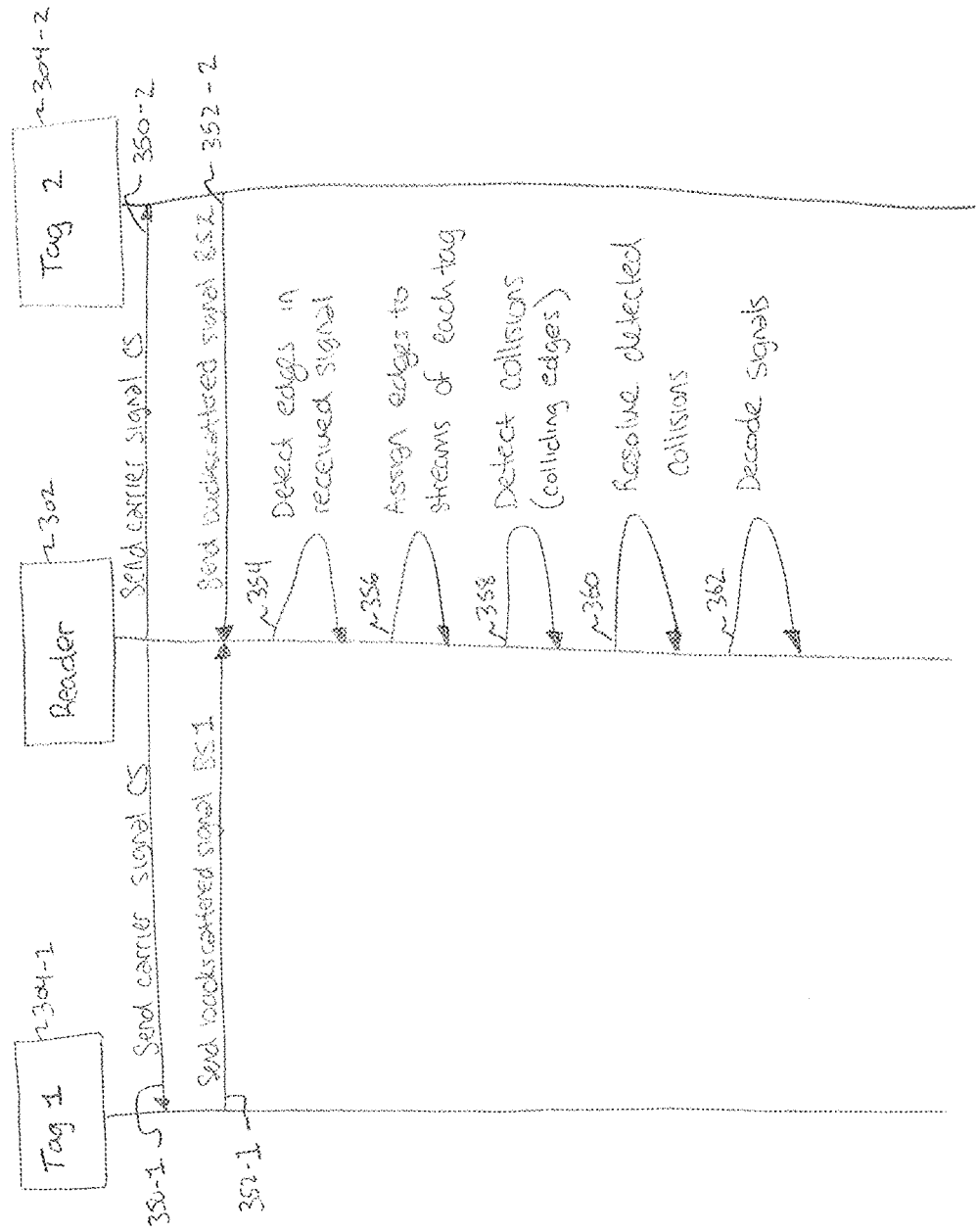
FIG. 4 is a sequence diagram illustrating one exemplary embodiment of a backscatter communication using a laissez faire (LF)-backscatter protocol.

FIG. 4 is a sequence diagram illustrating one exemplary backscatter communication 300 using the LF-backscatter protocol. In the backscatter communication 300, two tags 304-1 and 304-2 (collectively "tags 304" or "304") concurrently transmit data via backscattered signals to a reader 302. The illustrated tags 304-1 and 304-2 are RFID tags and the reader 302 is an RFID reader. A person of skill in the art will understand that other types and configurations of tags and readers can be used, and that any number of tags 304 can transmit backscattered signals to the reader 302 concurrently. In fact, in view of the present disclosures, a system that includes more tags is more power-efficient and transmits with greater throughput when compared to existing protocols, meaning it can be advantageous to use the present protocols in conjunction with more than two tags as compared to existing systems that use more than two tags.

In the illustrated exemplary embodiment, a reader 302 transmits a carrier signal CS to the tags 304-1 and 304-2 at steps 350-1 and 350-2, respectively. The carrier signal CS transmitted at steps 350-1 and 350-2 is generated by the reader 302 prior to being transmitted to the tags 304. Moreover, as known to those of skill in the art, the carrier signal CS can be represented as compromises of a sine wave and a cosine wave, known as in-phase (I) and quadrature (S) signals. As described above, by generating the carrier signal CS at the reader 302 rather than at the tags 304, the tags 304 can reduce their power consumption and requirement by avoiding this power-hungry process.

In turn, at steps 352-1 and 352-2, the tags 304-1 and 304-2, respectively, transmit data to the reader 302. That is, in response to receiving the carrier signal CS, the tags 304-1 and 304-2 reflect or backscatter signals BS1 and BS2 (collectively "backscattered signals BS" or "BS"), respectively, to the reader 302. It should be understood that the backscatter signals BS1 and BS2 can be transmitted to the reader 302 over the same frequency channel. In other instances, the respective transmissions can be over different frequency channels from each other and/or from the channel at which the reader transmitted the signal CS. The LF-backscatter protocol is configured such that the tags 304 blindly transmit data immediately or in response to receiving the carrier signal CS from the reader 302. In other words, the tags 304 do not coordinate with the reader 302 or other of the tags 304 prior to backscattering the signals BS1 and BS2 to the reader 302. Indeed, each of the tags 304 can transmit at any time and at any bitrate such that the tags 304 can take advantage of their maximum bitrates. The tags 304-1 and 304-2 backscatter or reflect the signals BS1 and BS2 to the reader 302 by toggling their respective transistors.

Although the tags 304 can transmit signals to the reader 302 at any time and bitrate, in the exemplary backscatter communication 300 illustrated in FIG. 4, the signals BS1 and BS2 transmitted at steps 352-1 and 352-2 are sent and received by the reader concurrently, or at least partially concurrently, for example, as illustrated in FIG. 5A during a time $t_{start}$ to $t_{end}$. As described in further detail below, each of the tags 304 can initiate transmissions simultaneously, or one after the other, such that at least a portion of each of the signals BS1 and BS2 transmitted at steps 352-1 and 352-2 is received by the reader 302 during a same time period. More specifically, in the square waveform graph 500A of FIG. 5A, which illustrates an exemplary backscatter communication, tags 404-1 ("Tag 1") and 404-2 ("Tag 2") transmit concurrently during an overlapping time period $t_{start}$ to $t_{end}$, though tag 404-1 starts its transmission at time $t_0$ and tag 404-2 starts its transmission at a different time $t_1$.

As known to those of skill in the art, data is sent from the tags 304-1 and 304-2 to the reader 302 by encoding data into a signal and modulating the signal back to the reader 302. For example, the data to be transmitted to the reader 302 and encoded into the backscattered signals BS1 and BS2 can be data that is collected, sampled or generated by sensors associated with each of the tags 304. In some embodiments, signal modulation can be performed using techniques such as amplitude shift keying (ASK), frequency shift keying (FSK), quadrature amplitude modulation (QAM), and other techniques known to those of skill in the art. It should be understood that, in some embodiments, the signals are modulated using ASK and similar techniques in which the reader 302 provides power (e.g., continuous power) to the tags 304. Power can be provided by the reader 302 to the tags 304 by incorporating energy in the carrier signal CS transmitted at steps 350-1 and 350-2.

Figure 5B:
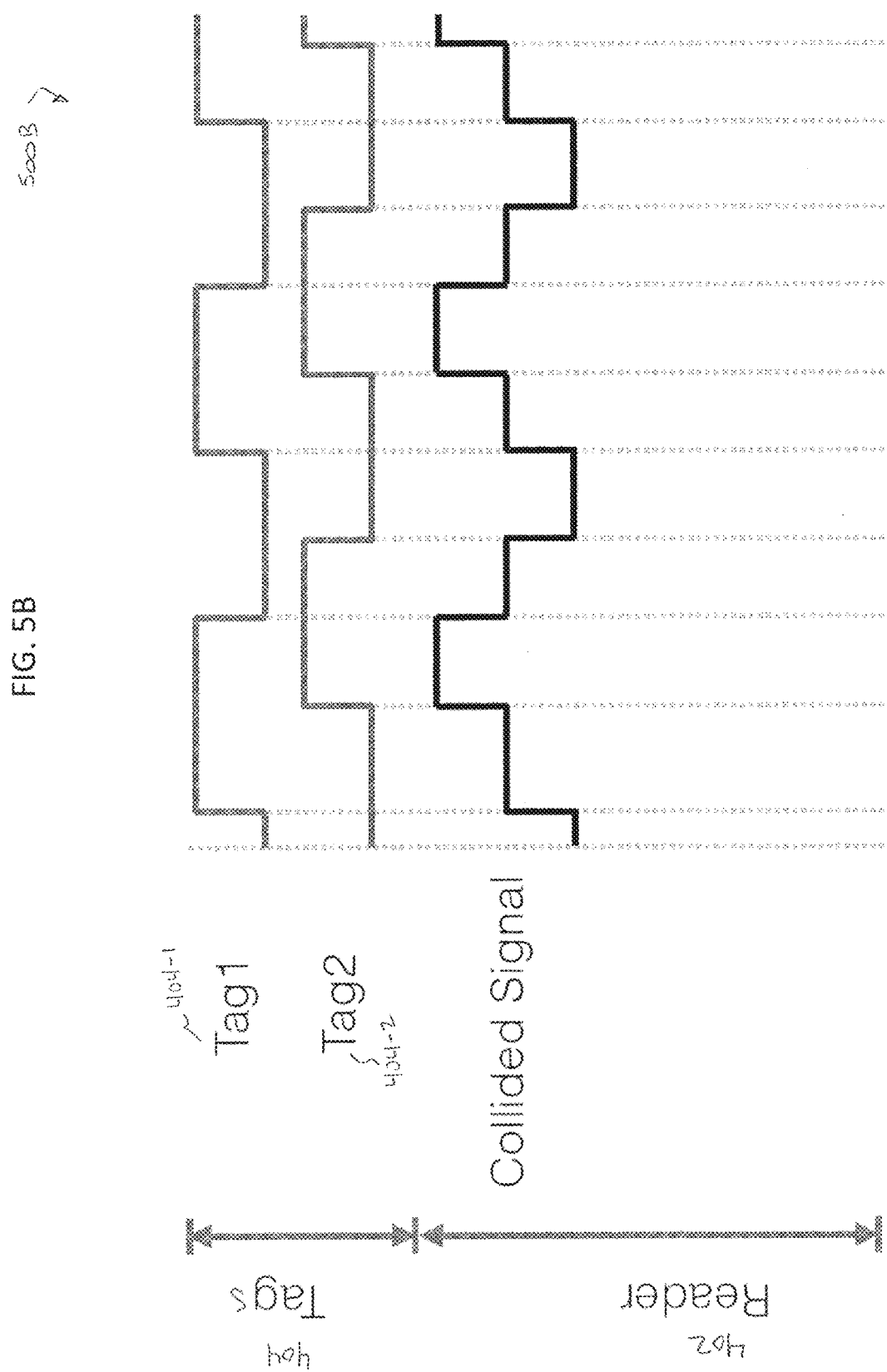
FIG. 5B is a graph illustrating an exemplary embodiment of a square waveform corresponding to a collided or combined signal received by the reader, of the concurrently transmitted signals of FIG. 5A.

Because the signals BS1 and BS2 are transmitted concurrently, they are received by the reader 302 as a single, continuous combined or collided signal. FIG. 5B is a square waveform graph 500B illustrating the exemplary backscatter communication of FIG. 5A. In FIG. 5B, the signals received from the first tag 404-1 and the second tag 404-2 are received as a collided or combined signed at the reader 402. Accordingly, with reference to FIG. 4, the concurrently backscattered signals BS1 and BS2 transmitted at steps 352-1 and 352-2 are received by the reader as a combined signal S and the reader 302 initiates a process of decoding the signal S and identifying the signals and/or data sent by each of the tags 304. In this regard, at step 354, the reader 302 detects signal edges in the combined signal S. Signal edges refer to transitions in a digital signal, for example, a transition in the state of any tag from either low to high (e.g., 0 to 1) or high to low (e.g., 1 to 0). Traditional edge detection techniques analyze the amplitude of a signal to identify these edges or transitions, often in an environment in which only a single device is transmitting to a reader. The LF-backscatter protocol described herein performs edge detection that can eliminate the impact of background amplitudes or noise caused by other tags concurrently transmitting signals to the reader. More specifically, the LF-backscatter protocol analyzes the IQ signal of the IQ channels to detect edges.

Often, edges are not clearly visible or identifiable in a signal due to other conflicting background amplitudes. Identifying a significant change in amplitude caused by a tag toggling its transistor (e.g., from low to high or high to low) thus requires that the change in amplitude exceed, or substantially exceed, any background amplitudes created by or associated with other tags. Background amplitude is high when many other tags are transmitting, and further, the background amplitude continually changes based on the state of the transmitting tags. Thus, the reader 302, using the LF-backscatter protocol at step 354, detects edges in the combined signal S while reducing or eliminating the effect of background amplitudes caused by concurrently transmitted and/or received signals. It does so by analyzing the IQ vector differential caused by edges, as described below.

The received signal S is a linear combination of concurrent individual signal transmissions from tags. Accordingly, the received backscatter signal S can be expressed at time t from N concurrent transmitting tags as shown in exemplary Equation 2:

$$S(t) = \sum_{j=1}^{N} S_I^j(t) + iS_Q^j(t) \quad (2)$$

In Equation 2, I and Q are the in-phase and quadrature channels, respectively. To detect and/or extract a signal edge from among the combined signal S, the reader analyzes the differential between the IQ signal before the edge occurs and after the edge occurs, as expressed in exemplary Equation 3:

$$\Delta S(t) = S(t_+) - S(t_-) \quad (3)$$

In Equation 3, $S(t_+)$ and $S(t_-)$ correspond to a portion of the signal S received by the reader 302 at time $t_+$ after the edge and at time $t_-$ before the edge. The reader 302 thus subtracts the portion of the received combined signal S after and before the edge to calculate the differential to remove the effect of background amplitudes (e.g., caused by other tags). In some embodiments, because a single calculation of $t_+$ and $t_-$ may result in a noisy edge estimate, the reader can calculate an average differential rather than a single calculation by identifying and using multiple points between the previous edge and the current edge as candidates for $t_+$ and multiple points between the current edge and the next edge as candidates for $t_-$.

Figure 6A:
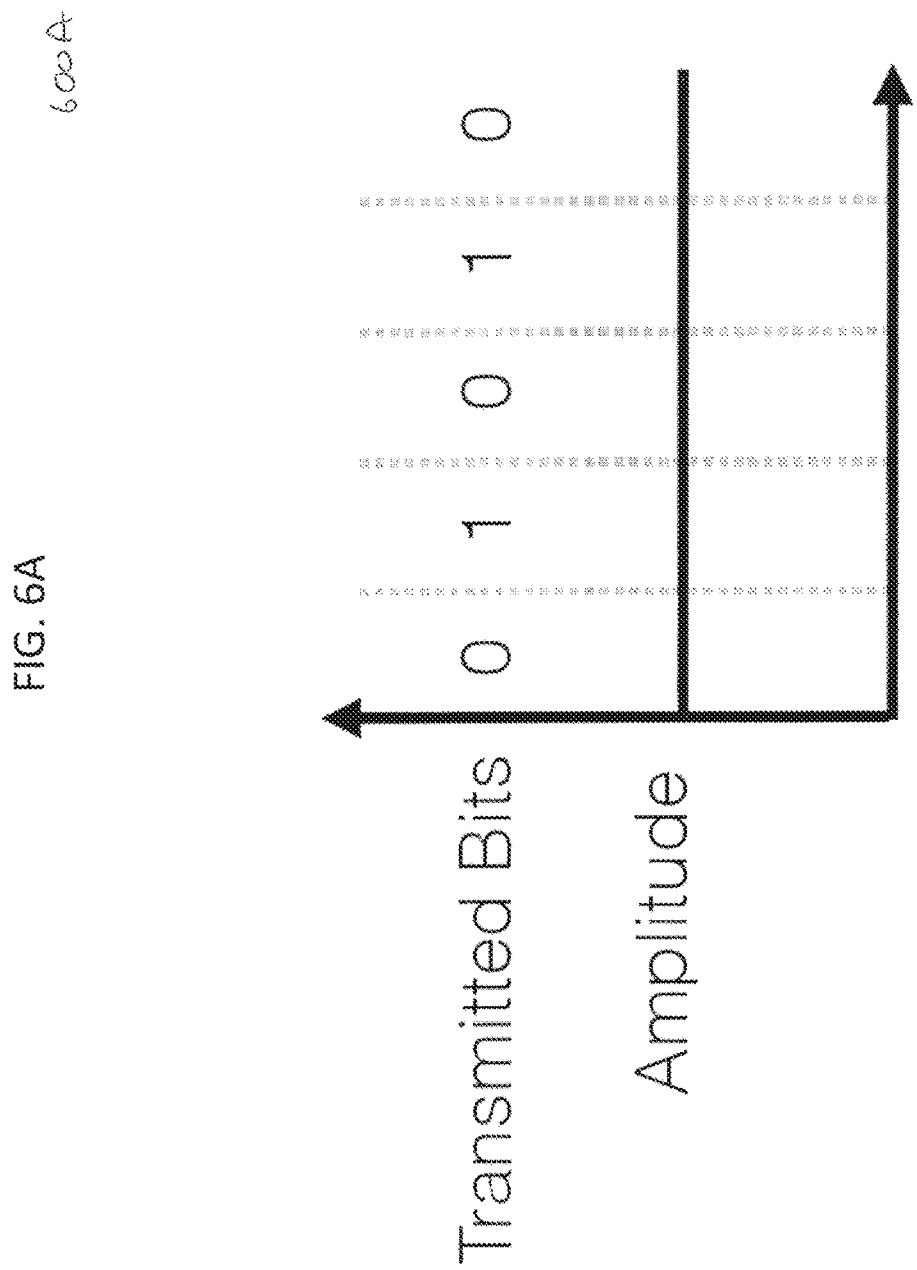
FIG. 6A is a graph illustrating an exemplary embodiment of a constant amplitude signal corresponding to a transmitted signal.

FIGS. 6A and 6B are exemplary graphs illustrating edge detection using amplitudes (FIG. 6A) and using IQ vectors (FIGS. 6B(1), 6B(2) and 6B(3)) according to exemplary embodiments. As shown in FIG. 6A, in one example, a reader receives a signal comprising bits 01010. However, as illustrated in the chart, in some cases, it is possible that the amplitude of the received signal can remain constant whether the received bit is a 0 or a 1. As described above, the amplitude can remain constant due to background signals or noise, which can continually change based on the activity of other transmitting tags, impacting the amplitude of the transmitted signal. Thus, as shown in FIG. 6A, the square waveform of the amplitude does not indicate transitions in the signal, and thus cannot be used to detect edges. As known to those of skill in the art, a constant amplitude is one exemplary way in which a background signal can impact a transmitted signal. As known to those of skill in the art, there are additional ways as well.

In contrast, FIGS. 6B(1), 6B(2) and 6B(3) illustrate, respectively, exemplary embodiments of: (1) a graph illustrating signals on the IQ channels when a tag transmits a bit equal to 1; (2) a graph illustrating signals on the IQ channels when a tag transmits a bit equal to 0; and (3) a graph illustrating, among other things, the received combined signal (e.g., bits 01010) on the I and Q channels. In FIGS. 6B(1) and 6B(2), V(rx) is the received signal vector, V(background) is the background signal vector, and V(tx) is the transmitted signal vector. In some embodiments, the reader 302 can calculate the background signal vector V(background) based on the frequency measured when no tag is transmitting, or on a fluctuating frequency measured while a tag is transmitting, since that tag's transmission frequency is known. The reader 302 can identify the transmitted signal vector V(tx) on the IQ channels by calculating the difference between the background signal vector V(background) and the received signal vector V(rx) when a 1 bit is transmitted and when a 0 bit is transmitted. In this way, the transmitted signal made up of bits 01010 can be represented in the I and Q channels such that edges can be detected. As known to those of skill in the art, the I and Q signals are calculated or measured by reading the analog to digital converter (ADC) values from the corresponding I and Q channels. In turn, the values read from the ADC converter are potted as a point (i,q), where i is the value obtained from the I channel and q is the value obtained from the Q channel. The vector plotted from (0,0) to (i,q) is therefore the signal vector for the received signal V(rx).

Figure 5C:
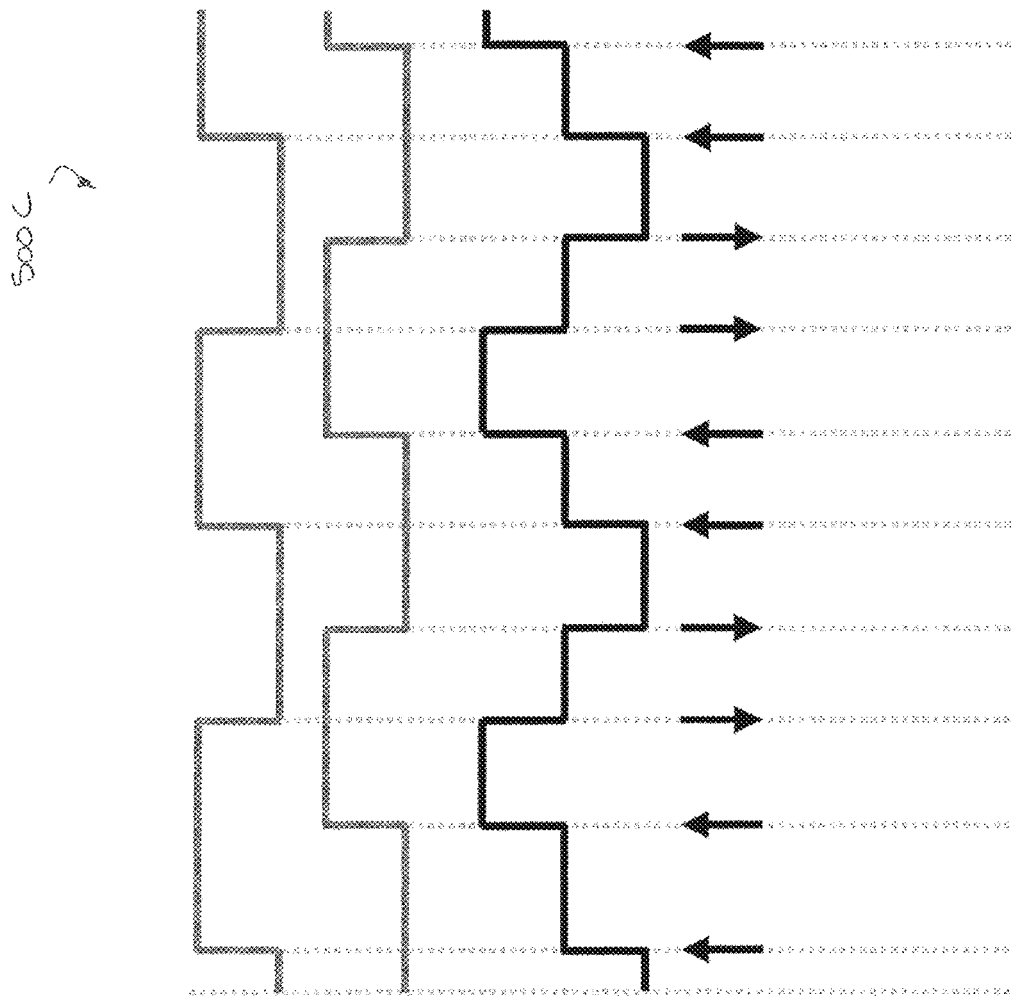
FIG. 5C is a graph illustrating an exemplary embodiment of signal edges detected from the combined signal of FIG. 5B.

FIG. 5C is a square waveform graph 500C illustrating the detected signal edges of the collided or combined signal of the exemplary backscatter communication of FIGS. 5A and 5B. As shown in FIG. 5C, the collided signal is the signal received by the reader 402 that combines the concurrently transmitted signals from the first tag 404-1 and the second tag 404-2. The reader can detect edges of the combined signal using the edge detection techniques described above in connection with step 354 of FIG. 3.

As a result of the edge detection performed at step 354, the reader 302 has a combined signal S as well as a sequence of edges associated therewith. Nonetheless, the detected edges correspond to the signal S that combines multiple concurrent backscattered signals BS1 and BS2 transmitted by the tags 304-1 and 304-2. The reader 302 therefore does not have any information identifying which of the tags 304-1 and 304-2 toggled its transistors in order to create the edge—i.e., which detected edges correspond to which tags. Moreover, the reader 302 does not have any information indicating what each of the identified edges represents. For instance, each edge can be (1) the result of a single tag toggling its transistor, (2) a collision resulting from multiple tags toggling their transistors at the same time, or (3) a spurious or false edge resulting from background noise.

Accordingly, at step 356, the reader 302 assigns the detected edges of the combined signal S to each of the tags 304-1 and 304-2. To this end, the LF-backscatter protocol employs epochs, and offset and rate selection techniques. By assigning detected edges to specific tags, it is possible to isolate or separate each of the signals transmitted by the tags. In some embodiments, using offset and transmission rate information to assign detected edges to tags and separate signals is sometimes referred to as time-domain or temporal separation. To assign edges to tags, the reader 302 divides the time during which backscatter communications with the tags occur into subsets of time referred to as epochs of a specific length. Each epoch is initiated by the reader 302 by shutting off and re-starting its carrier wave, which causes carrier signals to be transmitted to the tags 304-1 and 304-2. This, in turn, triggers the backscattering of signals from the tags 304-1 and 304-2 to the reader 302. At the start of an epoch, each of the tags 304-1 and 304-2 calculates and/or selects a random initial offset at which they will initiate the transmission of bits to the reader 302. By randomizing the offset each time an epoch begins, collision patterns are changed at each epoch such that collisions in one epoch are less likely to occur during the next epoch.

In some embodiments, the rate at which the tags 304-1 and 304-2 transmit signals to the reader 302 is a multiple of a specified base rate (e.g., 100 bps). That is, every tag in communication with the reader 302 is configured to transmit data at a rate that is a multiple of a base rate, for at least the duration of an epoch. By utilizing transmission rates that are multiples of the same base rate, the reader 302 can more easily detect and/or anticipate collisions between tags that randomly select the same offset. In other words, if two tags have a same offset at which to start transmission, and their transmission rates are multiples of a base rate, the tags and/or their signals can be expected to collide periodically throughout the epoch. Moreover, by requiring, at least in some embodiments, that transmission rates of the tags be multiples of the same base rate, the reader 302 can detect and discard false or spurious edges that do not repeat at a rate that is a multiple of the base rate.

As described above, at the start of each epoch, each tag calculates or selects random initial offsets. In order for the reader 302 to support as many concurrently transmitting tags as possible, it is preferable that the tags select fine-grained offsets. Fine-grained offsets provide more possible times at which tags are to initiate transmissions of signals to the reader 302, which reduces the potential for collisions. In some embodiments, tags can be equipped with fast-grained clocks, even as fast as the reader's clock, that can provide fast-grained offsets. However, providing fast-grained clocks on tags results in more hardware complexity at the tags and therefore more power consumption and requirements. A person skilled in the art, in view of the present disclosure, will understand this trade-off and can implement the desired design based on a number of factors, including but not limited to the other power requirements of the system, the desired use of the system, and the desired results for throughput and power.

The LF-backscatter protocol achieves the use of selecting fine-grained offsets by providing that tags begin transmitting data when they receive a carrier signal from the reader. In some embodiments, tags are designed to begin transmitting data immediately, or substantially immediately, after the reader turns on its carrier signal generator and/or the tags receive the carrier signal. When a carrier signal is received by a tag, the energy in the carrier signal charges a receiver capacitor (e.g., FIG. 1, capacitor 282) in the tag, which in turn triggers a comparator (e.g., FIG. 1, 284) when the voltage reaches a threshold that indicates that the carrier is turned on. Thus, the triggering of the comparator is subject to factors that randomize when the comparator fires, namely: (1) the energy received by the tag from the incoming carrier signal, which depends on placement and orientation of the tag; (2) the charging characteristics of the capacitor; and (3) the noise in the charging process. These sources of randomness cause the tags to naturally vary their selected offsets, which provides separation of signals and their edges.

Figure 5D:
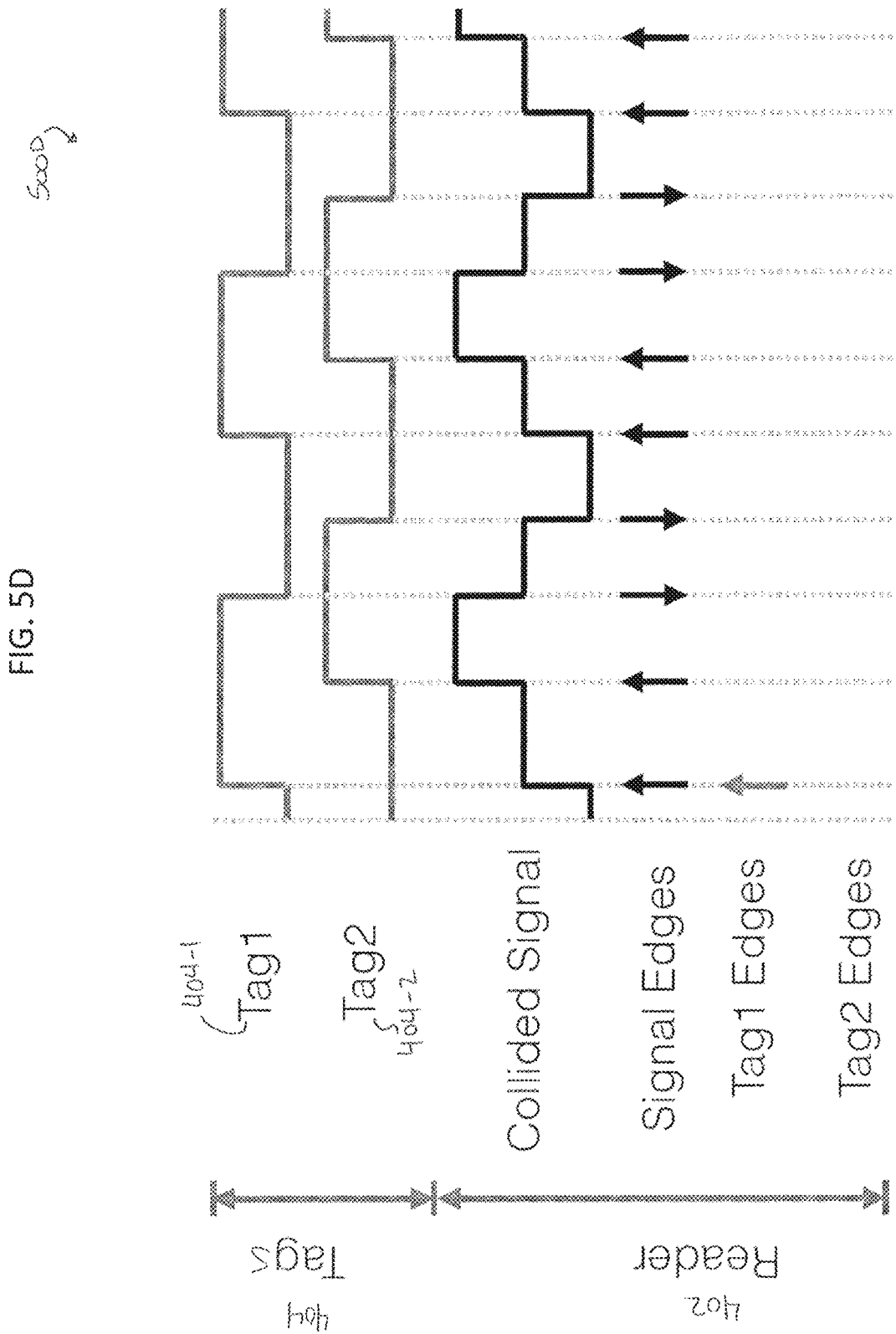
FIG. 5D is a graph illustrating an exemplary embodiment of the assignment of the first of the signal edges of FIG. 5C to the two tags.
Figure 5E:
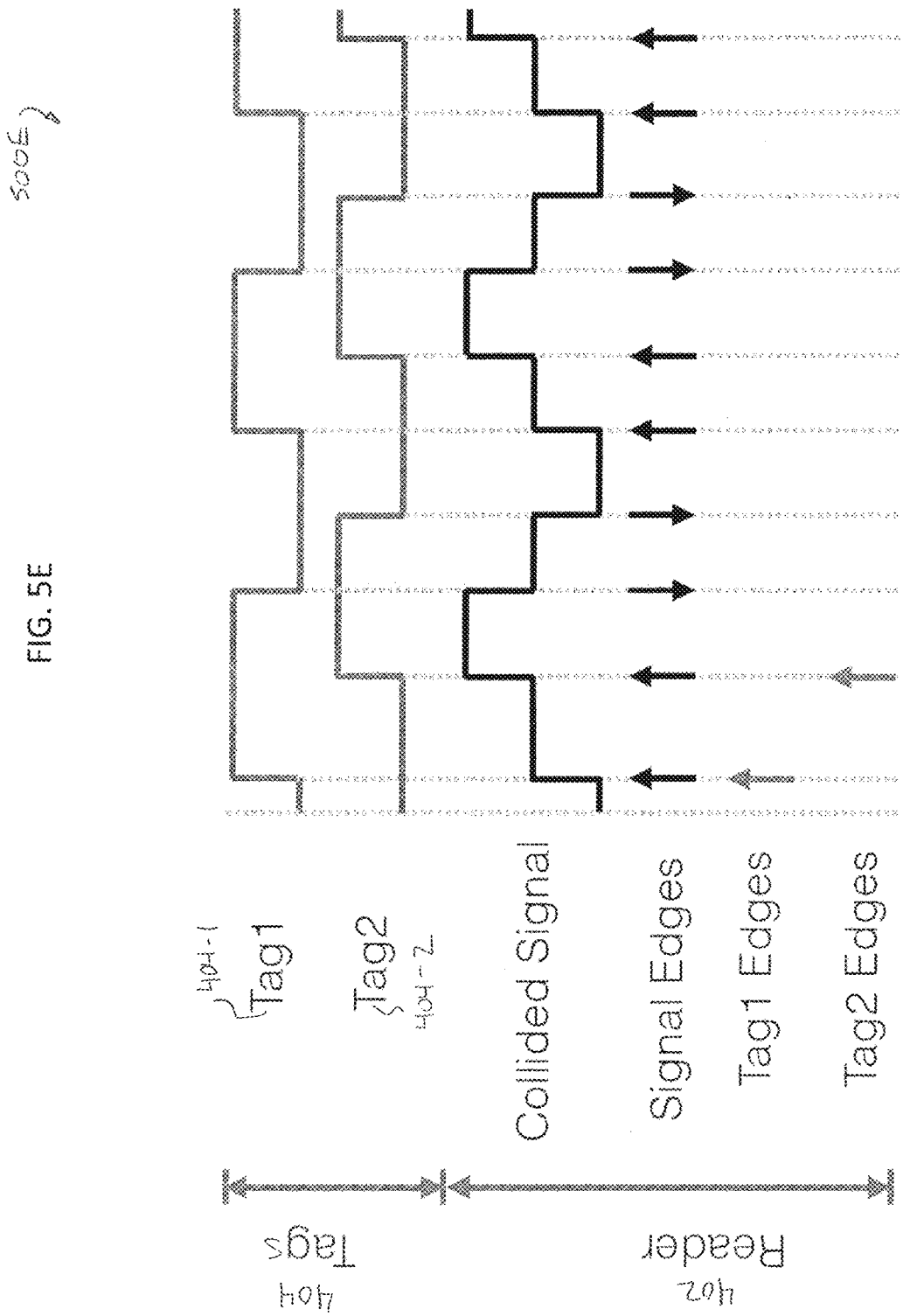
FIG. 5E is a graph illustrating an exemplary embodiment of the assignment of the second of the signal edges of FIG. 5C to the two tags.

The use of random and fine-grained offsets, as well as bitrates that are multiples of a same base rate, enables the reader 302 to assign the detected edges to specific tags. FIGS. 5D and 5E are square waveform graphs 500D and 500E, respectively, illustrating the assigning of edges to tags in the exemplary backscatter communication of FIGS. 5A to 5C. To assign edges to tags, the reader 402 sequentially analyzes each of the detected edges and, based on the offset and bitrate information of the tags 404-1 and 404-2, can determine which of the tags corresponds to each edge.

Figure 5F:
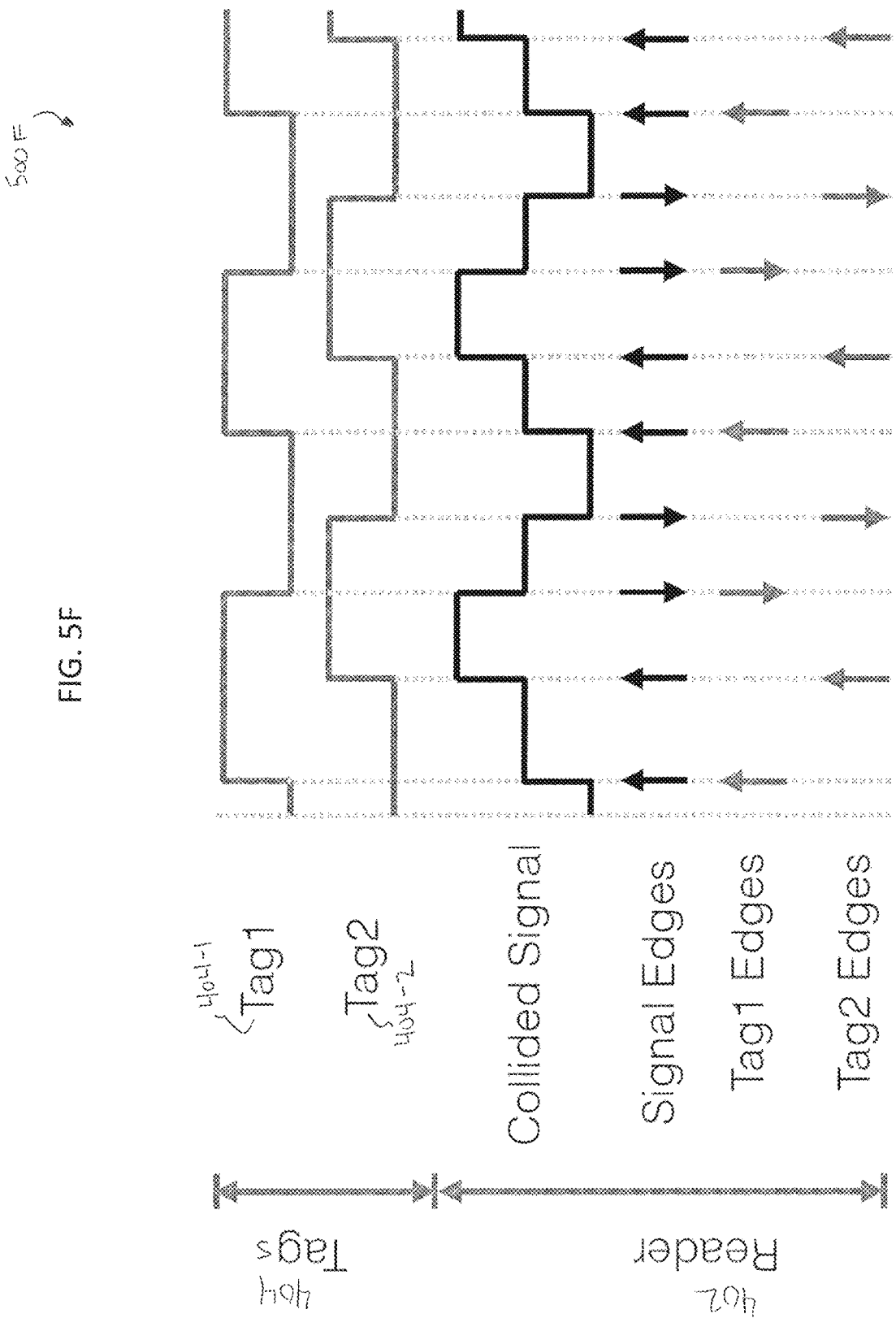
FIG. 5F is a graph illustrating an exemplary embodiment of the assignment of all of the signal edges of FIG. 5C to the two tags.
Figure 5G:
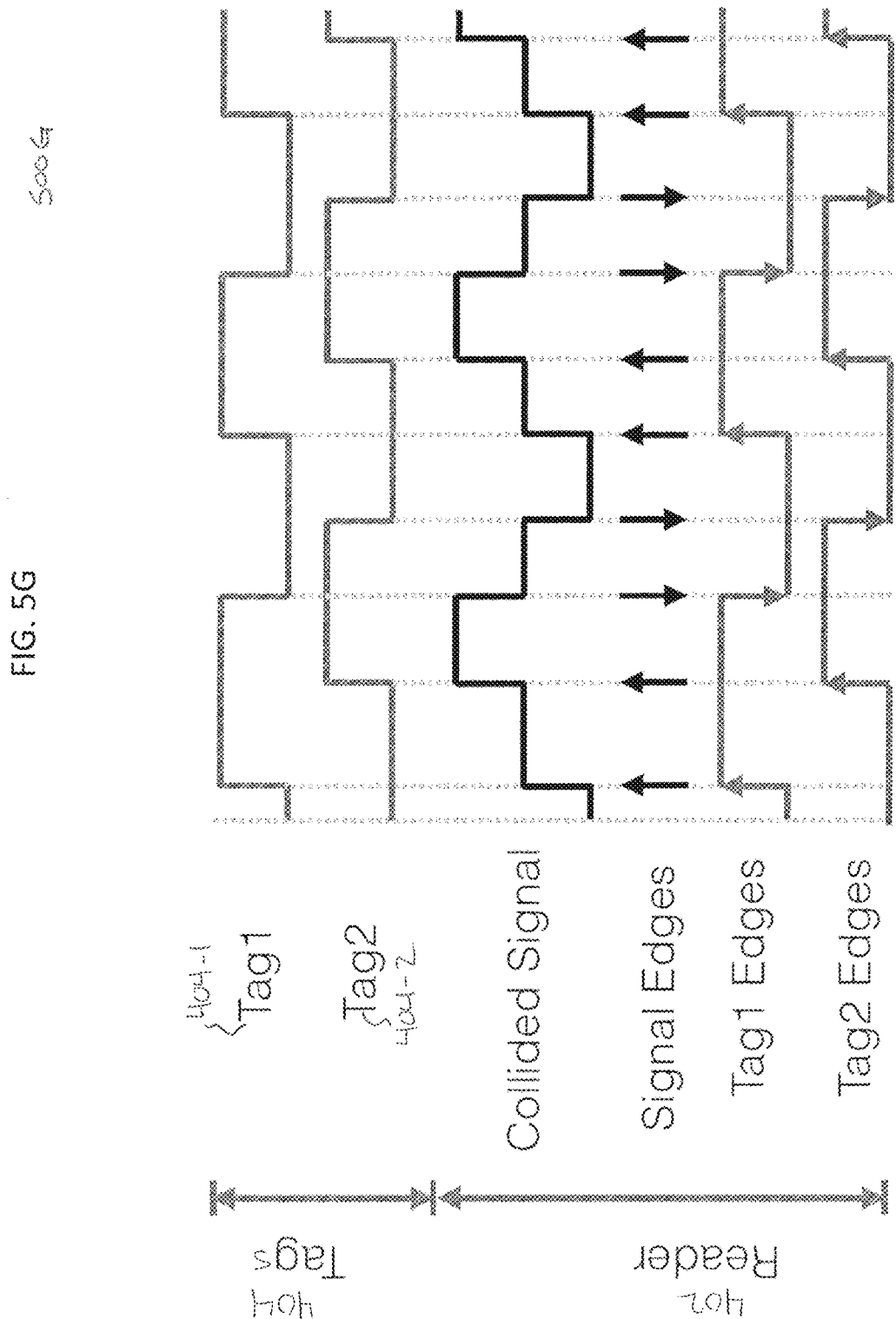
FIG. 5G is a graph illustrating an exemplary embodiment of streams generated from the assigned edges of FIG. 5F.

In FIG. 5D, signals and edges are shown in connection with an epoch. To assign the first edge to a tag, the reader 402 analyzes the first detected edge in the collided or combined signal. The reader 402 identifies that the first edge occurs at an offset from the start of the epoch. The reader 402 compares the offset of the first edge to the offsets selected by the tags 404. The reader 402 can determine that the first edge occurs at an offset that matches the offset selected by the first tag 404-1 (Tag 1), and therefore assigns the first edge to the first tag 404-1. In FIG. 5E, the reader 402 analyzes the second edge identified in the collided or combined signal. As in FIG. 5D, the reader 402 compares the offset of the second edge to the offsets selected by the tags 404, and determines that the second edge occurs at an offset that matches the offset selected by the second tag 404-2. Accordingly, the second edge is assigned to the second tag 404-2. The reader 402 repeats these steps for each of the detected edges, assigning each edge to one of the tags as shown in FIGS. 5F and 5G.

As described in further detail below, in some embodiments, multiple tags can have the same offset, causing at least one edge or signal collision to occur therebetween. In such cases, and generally during the edge assignment process, a reader can use the bitrate to identify which tag an edge corresponds. FIGS. 5F and 5G are square waveform graphs 500F and 500G illustrating the assigning of edges to tags in the exemplary backscatter communication of FIGS. 5A to 5E. In some embodiments, the assignment of the remaining edges illustrated in FIG. 5F can be performed by the reader using the selected bitrates of the tags. That is, after assigning an edge to a tag based on the offset of the tag matching the offset of the edge, the reader 402 can assign, or consider assigning, to that tag edges that occur at the selected rate measured from the offset of the tag. Once all of the edges have been assigned to tags, as shown in FIG. 5F, the reader 402 can identify the signals or streams transmitted by each of the tags 404-1 and 404-2, as illustrated in FIG. 5G.

In some embodiments, two or more edges corresponding to multiple tags can collide, for example, by toggling their respective transistors at the same time. This can occur, for instance, when two tags have the same offset. Thus, with reference again to FIG. 3, at step 358, the reader 302 detects the presence of collisions using cluster separation, on an IQ plane, of the received combined signal resulting from signals concurrently transmitted from various tags. It should be understood that, in some embodiments, the LF-backscatter protocol does not detect edge collisions, and instead proceeds to step 362 to decode the streams of edges. This cluster-based separation, which is sometimes referred to as IQ-domain separation, is now described in further detail with reference to FIG. 7.

Figure 7:
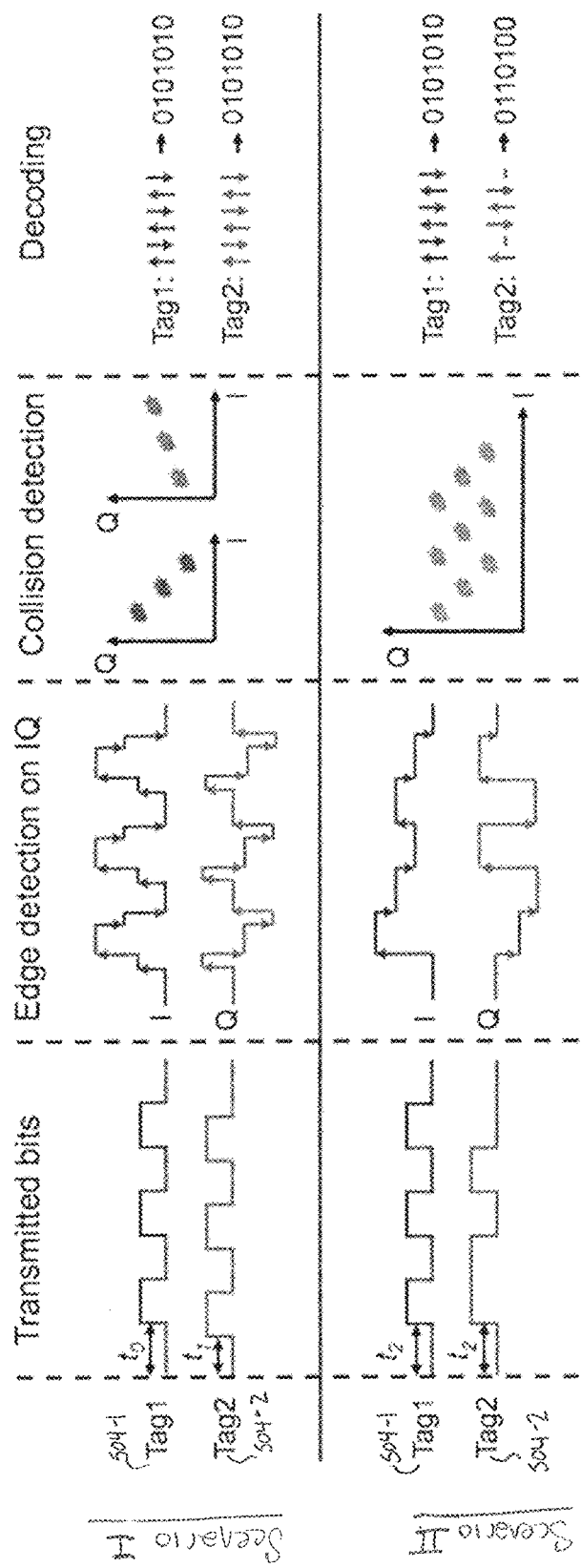
FIG. 7 is a diagram illustrating bit transmission, edge detection, collision detection, and decoding exemplary aspects of LF-backscatter protocol in connection with two concurrent transmission scenarios.

FIG. 7 is a graphical representation of exemplary aspects of the provided LF-backscatter protocol. More specifically, FIG. 7 illustrates two exemplary scenarios: (I) a first scenario in which a first tag 504-1 (Tag 1) and a second tag 504-2 (Tag 2) start transmitting at different times (e.g., have different offsets), and do not collide (referred to as "Scenario I"); and (2) a second scenario in which the first tag 504-1 and the second tag 504-2 start transmitting at the same time (e.g., have matching offsets) and have colliding edges ("Scenario II").

In the first scenario, the first tag 504-1 has an offset $t_0$ and the second tag 504-2 has an offset $t_1$, different and larger than $t_0$. As a result, the first tag 504-1 starts transmitting a signal to the reader prior to the second tag 504-2 initiating its transmission. In turn, as shown, edges are detected on the I and Q signals corresponding to or representing the received combined signal made up of the transmissions from the first tag 504-1 and the second tag 504-2. As mentioned above, in the first scenario, the transmitted signals of the first and second tags do not collide. This can be a result of the first and second tags having different offsets. Using the LF-backscatter protocol, collisions, or the absence of collisions, can be detected by plotting the I and Q signals on an IQ plot and analyzing the clusters created in the IQ plot.

To analyze clusters on an IQ plot, it should be understood that each tag can have edges or edge differentials in one of three states: rising (e.g., from low to high), falling (e.g., from high to low), and constant (e.g., maintaining high or low). Thus, when I and Q signals of a combined signal that are made up of non-colliding signals from multiple tags are plotted on an IQ plot, three clusters are created: one cluster corresponding to each state. That is, each point on the IQ plot represents an edge of the of the I and/or Q signals, or the combined signal. As shown in FIG. 7, in connection with the first, non-colliding scenario, the I and Q signals are plotted in respective IQ plots, resulting in three clusters of edges in each IQ plot. Thus, if the reader 302 determines at step 358 that the IQ plots result in only three clusters, the reader 302 can conclude that edge collisions do not exist in the combined signal.

In the second scenario, the first tag 504-1 and the second tag 504-2 initiate transmissions at the same offset $t_2$. Because the transmissions from the tags 504-1 and 504-2 are performed concurrently, the reader receives a combined signal. The reader performs edge detection on the I and Q signals corresponding to the combined signal. The I and or Q signals are plotted on an IQ plot to identify the number of clusters created. As previously mentioned, each edge can be in one of three states. However, when two edges are colliding such that they are overlapped, the overlapped edge can be in one of nine combinations of states, such as: (rising, rising), (rising, falling), (rising, constant), (falling, falling), (falling, rising), etc. In other words, it can be said that when there are k number of colliding tags, an IQ plot is expected to include $3^k$ number of clusters. As shown in FIG. 7, in connection with the second scenario, the IQ plot includes nine clusters, signaling to the reader that colliding edges exist. It should be understood that the number of clusters indicating the existence of collisions varies depending on the number of tags and/or the number and/or types of collisions.

Clusters can be identified on the IQ plot using various clustering algorithms known to those of skill in the art, including k-means clustering, to determine a best fit in terms of number of clusters. Thus, if the reader determines that three clusters (or any number of clusters equal to the number of possible edge states) on the IQ plot are not a good fit, the reader detects or concludes that a collision is likely to have occurred during the transmission of the signals.

Again with reference to FIG. 3, at step 360 the reader 302 resolves the detected collisions by either (1) causing retransmission of the collided signals, or (2) separating the collided signals. In some embodiments, selecting between retransmitting or separating is performed by input of a human, or is determined by the reader based on machine learning techniques that can predict odds of successfully avoiding collisions by retransmitting versus the odds of successfully separating the collided signals. It should be understood that retransmission of the collided signals can cause the collided signals to no longer collide because, when being sent in a new epoch, their offsets are randomized such that the odds of having the same offset the caused the collision is minimized.

In some embodiments, separating collided signals is performed by mapping each cluster in the IQ plot to the bit that each tag transmits. In some cases in which an edge can have one of three states (e.g., rising, falling, and constant), it can be determined that the cluster corresponding to the constant edge state is located at the origin in the IQ plot. The clusters for the other edge states, however, depend on the vector direction, which can also depend on tag placement, orientation, and other factors.

Figure 8:
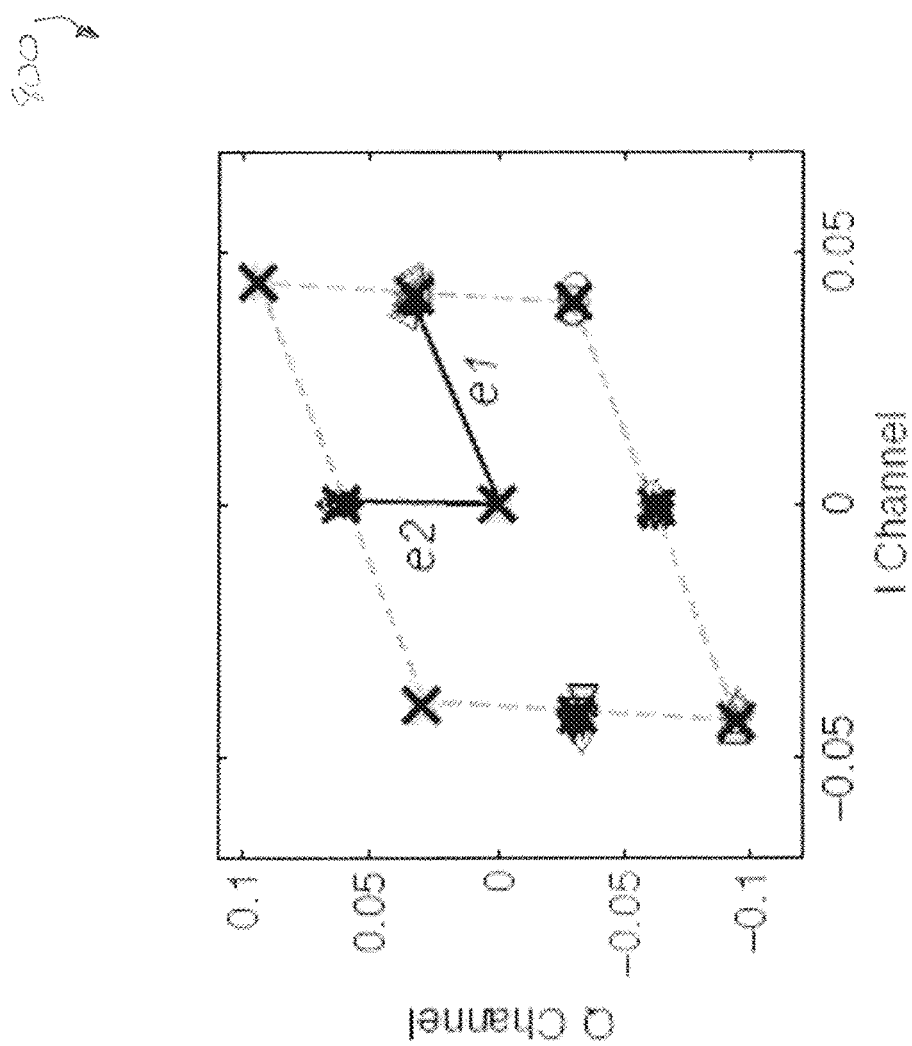
FIG. 8 is a graph illustrating exemplary embodiments of clusters on an IQ plot for identifying edge collisions.

FIG. 8 illustrates an exemplary embodiment of an IQ plot 800. In FIG. 8, the IQ plot 800 includes nine clusters formed by two colliding edges. As described above, the nine clusters correspond to the combination of three edge states by two colliding tags. The nine clusters can be referred to as $C_1$, $C_2, \ldots, C_9$, where each centroid maps or corresponds to one of nine pairs of states (e.g., (constant, rising, falling)). Thus, each centroid can be presented as a linear combination of signal edge vectors and direction coefficients as shown in Equation 4:

$$\begin{aligned} a_1 e_1 + b_1 e_2 &= C_1 \\ a_2 e_1 + b_2 e_2 &= C_2 \\ &\ldots \\ a_9 e_1 + b_9 e_2 &= C_9 \end{aligned} \quad (4)$$

In Equation 4, $a_i$ and $b_i$ indicate the direction of signal edges generated by two devices: ($a_i, b_i \in \{-1, 0, 1\}$); and $e_1$ and $e_2$ are complex values corresponding to the edge differentials. To associate each centroid with corresponding signal edges, Equation 4 is solved to obtain $a_1, a_2, \ldots, a_9$, $b_1, b_2, \ldots, b_9$, $e_1$, and $e_2$.

In an IQ plot having nine clusters, the cluster centered at the origin is decoded as representing the constant edge state (e.g., 0) from both transmitting tags. The other eight clusters form a parallelogram where the clusters in the midpoints of the edges correspond to the cases where only one of the edges is activated (e.g., rising, falling; or $-1$, 1) and the other edge is constant. By identifying the midpoints in the parallelograms, it is therefore possible to calculate the edge differentials $e_1$ and $e_2$, which in turn facilitates separating the edges into two streams: the values $a_i$ representing the first stream and the values $b_i$ representing the second stream. In this regard, in some embodiments, identifying the midpoints includes identifying the groups of three cluster centroids that are co-linear centroids, indicating edge lines. The midpoints of these co-linear centroids are used to identify the midpoint clusters, and thereby identify $e_1$, and $e_2$.

Yet again with reference to FIG. 4, at step 362, the reader 302 decodes the separated streams or signals corresponding to each of the tags. This allows the reader to identify the data transmitted by each of the tags. It should be understood that various decoding techniques known to those of skill in the art can be applied at step 362. In some embodiments, the reader 302 can decode the signals by comparing the value of each edge of the stream to the values associated with the possible edge states (e.g., constant, rising, falling). In this way, the reader 302 can determine the bit intended to be transmitted by the tags by parsing the edges. For example, if a reader received a sequence of "+1, −1, −, +1", the reader 302 can conclude that the bits intended to be transmitted are "1,0,0,1". As shown in FIG. 7, the reader 302 can decode a set of edges into bit values.

Figure 9:
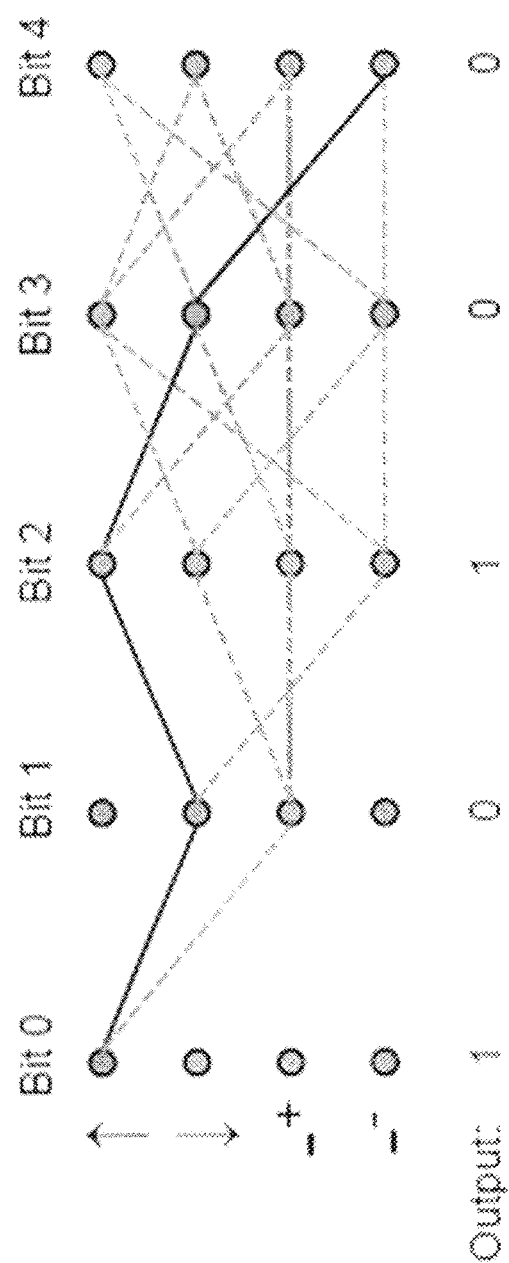
FIG. 9 is a graphical illustration of an exemplary embodiment of a Viterbi decoder for identifying valid bit values of a signal.

In some embodiments, the reader 302 can analyze each of the separated and/or decoded signals to detect errors. Error correction can be used to detect missing or incorrect bits in a signal. Because the systems and methods described herein use signal edges to decode sequences of ones and zeros transmitted by tags, the reader 302 can identify errors based on edges sequences that are not feasible. For instance, a rising edge (which correspond to a transmitted bit=1) cannot be followed by another rising edge, since this would indicate an incorrect value. To correct or address such errors, the reader can employ a decoder (e.g., Viterbi decoder) as illustrated in FIG. 9, which illustrates four possible edge states: a positive edge (represented by an up arrow), a negative edge (represented by a down arrow), no edge found but previous edge is a positive one (represented by a dash and plus sign), and an edge found but previous edge is negative (represented by a dash and a negative sign). The decoder can therefore be used to identify the most likely sequence of bits or bit values corresponding to a received sequence.

In FIG. 9, a five-bit sequence (bits 0 to 4) is input into the decoder to determine whether the decoded sequence is valid. The solid line in FIG. 9 represents the signal as decoded by the backscatter reader and the dashed lines represent valid values of the decoded signal. The decoder can step through each bit and determine whether its decoded value is valid. For example, since the first bit (bit 0) has a value of 1 (i.e., a positive edge), the second bit (bit 1) can only be represented by a down arrow (negative edge) or a dash and plus sign (no edge but previous edge is positive). Because the value of the bits represented by the solid line are valid, the decoded signal is deemed to be correct. On the other hand, if the line in the decoder of FIG. 9 traversed across edge representations that are invalid, the decoded signal is deemed to be incorrect. When a decoded signal is incorrect, the reader can use the decoder illustrated in FIG. 9 to correct errors in the decoded signal, based on the potential valid values determined by the decoder.

By decoding each set or stream of edges into bit values, the reader 302 can determine the data transmitted by each of the tags, despite the tags sending the signals concurrently, at various transmission rates, and without synchronizing their communications with the backscatter reader. Backscatter tags can therefore transmit data at their respective optimal rates, rather than conforming to specific and stringent rates dictated by transmission protocols optimized for particular hardware configurations. Moreover, the backscatter tags do not require complex logic to function as described herein, resulting in tags that have less memory (e.g., often needed to store power, data, logic) and power supply. The backscatter reader, which contains more computational power than the backscatter tags, can therefore assume the burden of receiving a colliding signal made up of multiple signals, and separating and decoding the signals. Thus, the LF-backscatter protocol described herein contributes to the growth of the Internet of Things and smart devices, by allowing devices and sensors ranging from basic (e.g., temperature sensor) to high sophistication (e.g., cameras, microphones) to frequently and even continuously sample and offload data to other devices.

One skilled in the art will appreciate further features and advantages of the disclosure based on the above-described embodiments. Accordingly, the disclosure is not to be limited by what has been particularly shown and described, except as indicated by the appended claims. All publications and references cited herein are expressly incorporated herein by reference in their entirety.

What is claimed is:

1. A method for decoding concurrent signals, comprising:
transmitting a carrier signal to a plurality of backscatter tags;
receiving a combined signal comprising respective backscattered signals transmitted by the plurality of backscatter tags, wherein the backscattered signals are transmitted at least partially concurrently by the plurality of backscatter tags, and wherein the plurality of backscatter tags transmit the backscatter signals starting at respective offsets and transmission rates;

detecting edges in the received combined signal based on a signal vector formed by in-phase (I) and quadrature (Q) signals corresponding to the received combined signal;

assigning each of the detected edges to streams corresponding to the plurality of backscatter tags, based on one or more of the offsets and transmission rates of the plurality of backscatter tags; and decoding the streams of detected edges by assigning one of a plurality of values to each of the detected edges of the streams corresponding to the plurality of backscatter tags, wherein the plurality of values correspond to possible edge states of the detected edges.

2. The method of claim 1, wherein the transmitting of the carrier signal:
(1) is initiated by re-starting a carrier wave generator, and
(2) causes the plurality of backscatter tags to start transmitting the backscattered signals.

3. The method of claim 1, wherein the backscattered signals are transmitted over a single frequency channel.

4. The method of claim 1, wherein the plurality of backscatter tags include backscatter tags having different sampling rates and transmission rates.

5. The method of claim 1, wherein the carrier signal includes power for powering the plurality of backscatter tags.

6. The method of claim 1,
wherein data is encoded into the carrier signal by the plurality of backscatter tags to create the backscattered signals, the data being encoded by toggling transistors of the plurality of backscatter tags, and
wherein toggling the transistors causes the edges to be created in the combined signal, the edges representing a transition from one edge state to another edge state.

7. The method of claim 1, wherein the detecting of the edges comprises:
measuring a background signal, the background signal indicating a frequency during a time when none of the plurality of backscatter tags are transmitting; and
identifying instances in the combined signal in which a positive or negative change in frequency is larger than the frequency of the background signal and/or a predetermined threshold, wherein each of the identified instances represents an edge.

8. The method of claim 1, wherein the assigning each of the detected edges to the streams corresponding to the plurality of backscatter tags includes, for each of the detected edges:
determining if an edge time at which the detected edge occurs is equal to the offset of any of the plurality of backscatter tags; and/or
determining if the edge time at which the detected edge occurs overlaps with any anticipated state transition times of the plurality of backscatter tags, the anticipated state transition times being calculated based on the transmission rates and the offsets of the plurality of backscatter tags.

9. The method of claim 8, wherein one of the detected edges is assigned to one of the streams corresponding to one of the plurality of backscatter tags if the one of the detected edges occurs at an edge time that is equal to the offset of the one of the plurality of backscatter tags and/or if the one of the detected edges occurs at an edge time that overlaps with an anticipated state transition time of the one of the plurality of backscatter tags.

10. A method for decoding concurrent signals, comprising:

transmitting a carrier signal to a plurality of backscatter tags;

receiving a combined signal comprising respective backscattered signals transmitted by the plurality of backscatter tags, wherein the backscattered signals are transmitted at least partially concurrently by the plurality of backscatter tags, and wherein the plurality of backscatter tags transmit the backscatter signals starting at respective offsets and transmission rates;

detecting edges in the received combined signal based on in-phase (I) and quadrature (Q) signals corresponding to the received combined signal;

detecting a presence of colliding edges among the detected edges, the colliding edges indicating that two or more of the streams have overlapping edges caused by respective backscatter tags transitioning between edge states at a same time;

resolving the colliding edges by (1) causing the backscattered signals corresponding to the colliding edges to be retransmitted, or (2) separating the colliding edges;

assigning each of the detected edges to streams corresponding to the plurality of backscatter tags, based on one or more of the offsets and transmission rates of the plurality of backscatter tags; and decoding the streams of detected edges by assigning one of a plurality of values to each of the detected edges of the streams corresponding to the plurality of backscatter tags, wherein the plurality of values correspond to possible edge states of the detected edges, wherein detecting the presence of colliding edges includes:
plotting the I and/or Q signals corresponding to the received combined signal on respective IQ plots; and
identifying a number of clusters in each of the IQ plots, with each cluster in the IQ plots representing a possible edge state,
wherein the colliding edges are deemed to be present among the detected edges if the number of identified clusters in any of the IQ plots exceeds a number of possible edge states, and
wherein the separating the colliding edges includes:
identifying an origin cluster in the IQ plots, the origin cluster representing a constant edge state;
identifying midpoint clusters by:
locating groups of the clusters that are co-linear; and
locating the midpoint clusters among each of the groups of co-linear clusters; and
identifying edge differentials based on the located midpoint clusters, the edge differentials indicating signal changes relative to a signal at the origin cluster.

11. The method of claim 10, wherein, when colliding edges are deemed to be present among the detected edges, the number of clusters in any of the IQ plots is equal to Nk, where N is equal to a number of tags colliding in the colliding edges, and k is equal to the number of possible edge states.

12. The method of claim 11, wherein the possible edge states comprise: (1) rising, (2) falling, and (3) constant.

13. The method of claim 10, wherein the transmitting of the carrier signal:
(1) is initiated by re-starting a carrier wave generator, and
(2) causes the plurality of backscatter tags to start transmitting the backscattered signals.

14. The method of claim 10,
wherein data is encoded into the carrier signal by the plurality of backscatter tags to create the backscattered signals, the data being encoded by toggling transistors of the plurality of backscatter tags, and wherein toggling the transistors causes the edges to be created in the combined signal, the edges representing a transition from one edge state to another edge state.

15. The method of claim 10, wherein the detecting of the edges comprises:

measuring a background signal, the background signal indicating a frequency during a time when none of the plurality of backscatter tags are transmitting; and identifying instances in the combined signal in which a positive or negative change in frequency is larger than the frequency of the background signal and/or a predetermined threshold, wherein each of the identified instances represents an edge.

16. A backscatter reader, comprising:

one or more antennas configured to communicate with a plurality of backscatter tags by: (1) transmitting a carrier signal, and (2) receiving a combined signal that includes backscattered signals transmitted by the plurality of backscatter tags at least partly concurrently, wherein the backscattered signals are transmitted by the plurality of backscatter tags at respective offsets and transmission rates; and a microcontroller operable to process transmission logic configured to decode the received combined signal by:
detecting edges in the received combined signal based on a signal vector formed by in-phase (I) and quadrature (Q) signals corresponding to the received combined signal;
assigning each of the detected edges to streams corresponding to the plurality of backscatter tags, based on one or more of the offsets and transmission rates of the plurality of backscatter tags; and
decoding the streams of detected edges by assigning one of a plurality of values to each of the detected edges of the streams corresponding to the plurality of backscatter tags, wherein the plurality of values correspond to possible edge states of the detected edges.

17. The backscatter reader of claim 16, wherein the backscattered signals are transmitted over a single frequency channel.

18. The backscatter reader of claim 16, wherein the plurality of backscatter tags include backscatter tags having different sampling rates and transmission rates.

19. The backscatter reader of claim 16, wherein the carrier signal includes power for powering the plurality of backscatter tags.

20. The backscatter reader of claim 16, wherein data is encoded into the carrier signal by the plurality of backscatter tags to create the backscattered signals, the data being encoded by toggling transistors of the plurality of backscatter tags, and wherein toggling the transistors causes the edges to be created in the combined signal, the edges representing a transition from one edge state to another edge state.

21. The backscatter reader of claim 16, wherein the detecting of the edges comprises:

measuring a background signal, the background signal indicating a frequency during a time when none of the plurality of backscatter tags are transmitting; and identifying instances in the combined signal in which a positive or negative change in frequency is larger than the frequency of the background signal and/or a predetermined threshold, wherein each of the identified instances represents an edge.

22. The backscatter reader of claim 16, wherein the assigning each of the detected edges to the streams corresponding to the plurality of backscatter tags includes, for each of the detected edges:

determining if an edge time at which the detected edge occurs is equal to the offset of any of the plurality of backscatter tags; and/or determining if the edge time at which the detected edge occurs overlaps with any anticipated state transition times of the plurality of backscatter tags, the anticipated state transition times being calculated based on the transmission rates and the offsets of the plurality of backscatter tags.

23. The backscatter reader of claim 22, wherein one of the detected edges is assigned to one of the streams corresponding to one of the plurality of backscatter tags if the one of the detected edges occurs at an edge time that is equal to the offset of the one of the plurality of backscatter tags and/or if the one of the detected edges occurs at an edge time that overlaps with an anticipated state transition time of the one of the plurality of backscatter tags.

24. A backscatter reader, comprising:

one or more antennas configured to communicate with a plurality of backscatter tags by: (1) transmitting a carrier signal, and (2) receiving a combined signal that includes backscattered signals transmitted by the plurality of backscatter tags at least partly concurrently, wherein the backscattered signals are transmitted by the plurality of backscatter tags at respective offsets and transmission rates; and a microcontroller operable to process transmission logic configured to decode the received combined signal by:
detecting edges in the received combined signal based on in-phase (I) and quadrature (Q) signals corresponding to the received combined signal;
detecting a presence of colliding edges among the detected edges, the colliding edges indicating that two or more of the streams have overlapping edges caused by respective backscatter tags transitioning between edge states at a same time;
resolving the colliding edges by (1) causing the backscattered signals corresponding to the colliding edges to be retransmitted, or (2) separating the colliding edges, assigning each of the detected edges to streams corresponding to the plurality of backscatter tags, based on one or more of the offsets and transmission rates of the plurality of backscatter tags; and
decoding the streams of detected edges by assigning one of a plurality of values to each of the detected edges of the streams corresponding to the plurality of backscatter tags, wherein the plurality of values correspond to possible edge states of the detected edges, wherein the detecting the presence of colliding edges includes:
plotting the I and/or Q signals corresponding to the received combined signal on respective IQ plots; and
identifying a number of clusters in each of the IQ plots, with each cluster in the IQ plots representing a possible edge state, wherein the colliding edges are deemed to be present among the detected edges if the number of identified clusters in any of the IQ plots exceeds a number of possible edge states, and wherein the separating of the colliding edges includes:
- identifying an origin cluster in the IQ plots, the origin cluster representing a constant edge state;
- identifying midpoint clusters by:
  - locating groups of the clusters that are co-linear; and
  - locating the midpoint clusters among each of the groups of co-linear clusters; and
- identifying edge differentials based on the located midpoint clusters, the edge differentials indicating signal changes relative to a signal at the origin cluster.

25. The backscatter reader of claim 24, wherein, when colliding edges are deemed to be present among the detected edges, the number of clusters in any of the IQ plots is equal to Nk, where N is equal to a number of tags colliding in the colliding edges, and k is equal to the number of possible edge states.

26. The backscatter reader of claim 25, wherein the possible edge states comprise: (1) rising, (2) falling, and (3) constant.

27. The backscatter reader of claim 24,
wherein data is encoded into the carrier signal by the plurality of backscatter tags to create the backscattered signals, the data being encoded by toggling the transistors of the plurality of backscatter tags, and
wherein toggling the transistors causes the edges to be created in the combined signal, the edges representing a transition from one edge state to another edge state.

28. The backscatter reader of claim 24, wherein the detecting of the edges comprises:
- measuring a background signal, the background signal indicating a frequency during a time when none of the plurality of backscatter tags are transmitting; and
- identifying instances in the combined signal in which a positive or negative change in frequency is larger than the frequency of the background signal and/or a predetermined threshold, wherein each of the identified instances represents an edge.

29. The backscatter reader of claim 24, wherein the assigning each of the detected edges to the streams corresponding to the plurality of backscatter tags includes, for each of the detected edges:
- determining if an edge time at which the detected edge occurs is equal to the offset of any of the plurality of backscatter tags; and/or
- determining if the edge time at which the detected edge occurs overlaps with any anticipated state transition times of the plurality of backscatter tags, the anticipated state transition times being calculated based on the transmission rates and the offsets of the plurality of backscatter tags.

* * * * *